US010168149B2

(12) United States Patent
Pittman et al.

(10) Patent No.: US 10,168,149 B2
(45) Date of Patent: Jan. 1, 2019

(54) FORAGE BIOMASS ESTIMATION DEVICES, SYSTEMS, AND METHODS

(71) Applicant: The Samuel Roberts Noble Foundation, Inc., Ardmore, OK (US)

(72) Inventors: Josh Pittman, Ardmore, OK (US); Twain Butler, Ardmore, OK (US)

(73) Assignee: NOBLE RESEARCH INSTITUTE, LLC, Ardmore, OK (US)

( * ) Notice: Subject to any disclaimer, the term of this patent is extended or adjusted under 35 U.S.C. 154(b) by 0 days.

(21) Appl. No.: 14/863,296

(22) Filed: Sep. 23, 2015

(65) Prior Publication Data
US 2016/0084635 A1 Mar. 24, 2016

Related U.S. Application Data

(60) Provisional application No. 62/054,875, filed on Sep. 24, 2014.

(51) Int. Cl.
*G01B 11/06* (2006.01)
*G01B 21/02* (2006.01)
(52) U.S. Cl.
CPC .................................. *G01B 21/02* (2013.01)
(58) Field of Classification Search
CPC ........ G01B 21/02; G01B 11/02; G01B 21/08; G01B 21/22; G01B 7/02; G01B 5/02; G01B 21/06; G01B 11/026; G01B 11/028; G01B 15/00; G01B 3/205; G01B 11/0666; G01B 11/105; G01B 13/02; B65H 2220/03; G01C 15/002; G01N 15/0227; G01N 15/1475
See application file for complete search history.

(56) References Cited

U.S. PATENT DOCUMENTS

| 3,555,557 | A | * | 1/1971 | Nacci | B41M 5/26 250/318 |
| 4,037,048 | A | * | 7/1977 | Walker | G01J 3/36 348/164 |
| 6,091,500 | A | * | 7/2000 | Bahr | G01B 11/105 250/559.24 |
| 6,538,755 | B1 | * | 3/2003 | Propst, Jr. | G01B 11/105 356/635 |
| 2009/0141261 | A1 | * | 6/2009 | Lukas | G01C 15/002 356/4.01 |

(Continued)

OTHER PUBLICATIONS

Fricke et al ("Assessment of forage mass from grassland swards by height measurement using an ultrasonic sensor", Computers and Electronics in Agriculture 79 (2011) 142-152).*

(Continued)

*Primary Examiner* — Mohamed K Amara
(74) *Attorney, Agent, or Firm* — Dentons US LLP

(57) ABSTRACT

Some illustrative embodiments of a system for estimating forage growth at an area of interest may include a mobile support, a laser sensor, and an ultrasonic sensor. The laser sensor and the ultrasonic sensor may each be supported by the mobile support, and may each be configured to sense the forage growth at the area of interest. The laser sensor may generate laser forage data corresponding to the forage growth, and the ultrasonic sensor may generate ultrasonic forage data corresponding to the forage growth. A measured forage growth value may be determined as a function of the laser forage data and the ultrasonic forage data.

30 Claims, 8 Drawing Sheets

(56) References Cited

U.S. PATENT DOCUMENTS

| | | | | |
|---|---|---|---|---|
| 2009/0326359 | A1* | 12/2009 | Hendriks | A61B 5/0066 600/407 |
| 2010/0292955 | A1* | 11/2010 | Van Stan, II | G01B 11/24 702/159 |
| 2011/0288818 | A1* | 11/2011 | Thierman | G01B 11/00 702/159 |
| 2012/0281229 | A1* | 11/2012 | Montgomery | A61B 5/0084 356/477 |
| 2013/0131856 | A1* | 5/2013 | Nitsche | G01B 11/105 700/118 |
| 2013/0205610 | A1* | 8/2013 | Wildner | G01B 21/02 33/701 |
| 2015/0170109 | A1* | 6/2015 | Sakuragi | B65G 43/02 705/7.25 |
| 2015/0285630 | A1* | 10/2015 | Rodriguez | G01B 21/28 702/156 |
| 2018/0180768 | A1* | 6/2018 | Wolf | G01W 1/02 |

OTHER PUBLICATIONS

Scotford et al. ("Combination of Spectral Reflectance and Ultrasonic Sensing to monitor the Growth of Winter Wheat", Biosystems Engineering (2004) 87 (1), 27-38).*
http://skyeinstruments.info/index_htm_files/SKR%201800%202-channel%20Light%20Sensor%20rev%200112%20.pdf.*
http://www.pepperl-fuchs.us/usa/en/classid_186.htm?view=productdetails&prodid=1266.*
Aziz et al., "Ultrasonic sensing for corn plant canopy characterization," ASAE/CSAE Annual International Meeting, Ottawa, Ontario, Canada, 2004.
Busemeyer et al., "BreedVision—A Multi-Sensor Platform for Non-Destructive Field-Based Phenotyping in Plant Breeding," *Sensors* 13:2830-2847, 2013.
Cozzolino et al., "Determination of dry matter and crude protein contents of undried forages by near-infrared reflectance spectroscopy," *Journal of the Science of Food and Agriculture* 82:380-384, 2002.
Dougherty et al., "Calibration and use of plate meter regressions for pasture mass estimation in an Appalachian silvopasture," *Archives of Agronomy and Soil Science* 59:305-315, 2013.
Ehlert et al., "Measuring crop biomass density by laser triangulation," *Computers and Electronics in Agriculture* 61:117-125, 2008.
Ehlert et al., "Suitability of a laser rangefinder to characterize winter wheat," *Precision Agriculture* 11:650-663, 2010.
Erdle et al., "Comparison of active and passive spectral sensors in discriminating biomass parameters and nitrogen status in wheat cultivars," *Field Crops Research* 124:74-84, 2011.
Escolà et al., "Performance of an ultrasonic ranging sensor in apple tree canopies," *Sensors* 11:2459-2477, 2011.
Fehmi et al., "A plate meter inadequately estimated herbage mass in a semi-arid grassland," *Grass and Forage Science* 64:322-327, 2009.
Freeman et al., "By-plant prediction of corn forage biomass and nitrogen uptake at various growth stages using remote sensing and plant height," *Agronomy Journal* 99:530-536, 2007.
Fricke et al., "Combining ultrasonic sward height and spectral signatures to assess the biomass of legume-grass swards," *Computers and Electronics in Agriculture* 99:236-247, 2013.
Gamon et al., "Relationships between NDVI, canopy structure, and photosynthesis in three Californian vegetation types," *Ecological Applications* 5:28-41, 1995.
Gnyp et al., "Hyperspectral canopy sensing of paddy rice aboveground biomass at different growth stages," *Field Crops Research* 155:42-55, 2014.
Golodets et al., "Quantitative vs qualitative vegetation sampling methods: A lesson from a grazing experiment in a Mediterranean grassland," *Applied Vegetation Science* 16:502-508, 2013.
Henning et al., "Detailed stem measurements of standing trees from ground-based scanning LIDAR," *Forest Science* 52:67-80, 2006.
Hong et al., "Comparison of ground-based remote sensors for evaluation of corn biomass affected by nitrogen stress," *Communications in Soil Science and Plant Analysis* 38:2209-2226, 2007.
Hopkinson et al., "Towards a universal lidar canopy height indicator," *Canadian Journal of Remote Sensing* 32:139-152, 2006.
Hosoi et al., "Estimating vertical plant area density profile and growth parameters of a wheat canopy at different growth stages using three-dimensional portable lidar imaging," *ISPRS Journal of Photogrammetry and Remote Sensing* 64:151-158, 2009.
Hutchings et al., "An ultrasonic rangefinder for measuring the undisturbed surface height of continuously grazed grass swards," *Grass and Forage Science* 45:119-127, 1990.
Interrante et al., "Production and economics of steers grazing tall fescue with annual legumes or fertilized with nitrogen," *Crop Science* 52:1940-1948, 2012.
Jones et al., "Chlorophyll estimation using multispectral reflectance and height sensing," *Transactions of the ASABE* 50:1867-1872, 2007.
Kataoka et al., "Performance of crop height sensing using ultrasonic sensor and laser beam sensor," *ASAE Paper No. 021184*. St. Joseph, Mich., 2002.
Kercher et al., "Effects of sampling teams and estimation methods on the assessment of plant cover," *Journal of Vegetation Science* 14:899-906, 2003.
Laliberte et al., "Comparison of two sampling methods for quantifying changes in vegetation composition under rangeland development," *Rangeland Ecology and Management* 63:537-545, 2010.
Lati et al., "Three-dimensional image-based modelling of linear features for plant biomass estimation," *International Journal of Remote Sensing* 34:6135-6151, 2013.
Luo et al., "Estimating FPAR of maize canopy using airborne discrete-return LiDAR data," *Optics Express* 22:5106-5117, 2014.
Machado et al., "Spatial and temporal variability of corn growth and grain yield: Implications for site-specific farming," *Crop Science* 42:1564-1576, 2002.
Mazzetto et al., "Optical and analogical sensors for crop monitoring in precision viticulture," *Agricultural and biosystems engineering for a sustainable world. International Conference on Agricultural Engineering*, Hersonissos, Crete, Greece, Jun. 23-25, 2008.
Pilliod et al., "Performance of quantitative vegetation sampling methods across gradients of cover in great basin plant communities," *Rangeland Ecology and Management* 66:634-647, 2013.
Rennie et al., "Calibration of the C-DAX rapid pasturemeter and the rising plate meter for kikuyu-based northland dairy pastures," *Proceedings of the New Zealand Grassland Association* 71:49-55, 2009.
Sanderson et al., "Estimating forage mass with a commercial capacitance meter, rising plate meter, and pasture ruler," *Agronomy Journal* 93:1281-286, 2001.
Selbeck et al., "Testing a vehicle-based scanning LIDAR sensor for crop detection," *Canadian Journal of Remote Sensing* 36:24-35, 2010.
Sui et al., "Ground-based sensing system for cotton nitrogen status determination," *Transactions of the ASABE* 49:1983-1991, 2006.
Tucker, "A critical review of remote sensing and other methods for non-destructive estimation of standing crop biomass," *Grass and Forage Science* 35:177-182, 1980.
Zaman et al., "Effects of foliage density and ground speed on ultrasonic measurement of citrus tree volume," *Applied Engineering in Agriculture* 20:173-178, 2004.

* cited by examiner

FORAGE BIOMASS ESTIMATION DEVICES, SYSTEMS, AND METHODS

CROSS REFERENCE TO RELATED APPLICATIONS

This application claims priority to U.S. Provisional Application No. 62/054,875, filed Sep. 24, 2014, which is herein incorporated by reference in its entirety.

FIELD OF THE INVENTION

This disclosure relates generally to estimation of vegetative parameters and, more particularly, but not by way of limitation, to devices, systems, and methods for estimating forage growth or biomass.

BACKGROUND OF THE INVENTION

Non-destructive methods for estimating dry biomass have been developed using plant or canopy measurements. For example, vegetative mass may be considered a function of canopy or plant height. An estimate of canopy or plant height may be recorded, and an empirical relationship can be created between height and dry matter. Devices such as, for example, the rising plate meter, capacitance meter, and meter stick may facilitate physical measurements of vegetation height. Limitations associated with these techniques may include the labor and time needed to collect the measurements. Additionally, challenges can be encountered in obtaining accurate height measurements due to variations based, for example, on vegetation growth characteristics and spatial variability. These factors may present difficulty in creating a robust estimation model that is representative of a comprehensive range of dry biomass volumes that may be encountered in a given area or sample.

Remote sensing strategies employing various types of electronic sensors may overcome some of the limitations encountered with physical measurement strategies. In general, electronic sensors may permit more measurements to be taken in a considerably smaller amount of time enabling the user to collect a larger data sample. This increased magnitude in data collection may provide the foundation for development of a statistically robust estimation model that is a more comprehensive and accurate representation of vegetative mass at a sampling area or area of interest. However, the accuracy of electronically sensed data can be affected by a variety of factors, such as when vegetation growth reaches partial or full canopy closure. At partial or full canopy closure, a point of reflectance saturation in some sensors may occur, which may reduce the accuracy of the sensed data. Thus, improvements to devices, systems, and methods enabling more efficient and accurate acquisition of data for estimating forage growth may be desirable.

SUMMARY OF THE INVENTION

Shortcomings with certain aspects of devices, systems, and methods for estimating forage growth are addressed as shown and described in a variety of illustrative, non-limiting embodiments herein.

In some illustrative embodiments, a system for estimating forage growth at an area of interest may include a mobile support, a laser sensor, an ultrasonic sensor, and a processing unit. The laser sensor may be supported by the mobile support, and may be configured to sense the forage growth at the area of interest to generate laser forage data corresponding to the forage growth. The ultrasonic sensor may be supported by the mobile support, and may be positionally associated with the laser sensor. The ultrasonic sensor may be configured to sense the forage growth at the area of interest to generate ultrasonic forage data corresponding to the forage growth. The processing unit may be configured to receive the laser forage data from the laser sensor and the ultrasonic forage data from the ultrasonic sensor. Further, the processing unit may be configured to determine a measured forage growth value as a growth function of the laser forage data and the ultrasonic forage data.

In some illustrative embodiments, a method of computing forage growth at an area of interest may include moving a laser sensor and an ultrasonic sensor relative to the area of interest. The method may further include obtaining laser forage data from the laser sensor at a processing unit. The laser forage data may correspond to the forage growth at the area of interest. The method may further include obtaining ultrasonic forage data from the ultrasonic sensor at the processing unit. The ultrasonic forage data may correspond to the forage growth at the area of interest. The method may further include determining a measured forage growth value as a function of contributions from the laser forage data and the ultrasonic forage data with the processing unit.

In some embodiments, a method of computing forage growth at an area of interest may include obtaining laser forage data from a laser sensor corresponding to the forage growth at the area of interest, and obtaining ultrasonic forage data from an ultrasonic sensor corresponding to the forage growth at the area of interest. The method may further include receiving the laser forage data and the ultrasonic forage data at a processing unit, and determining a measured forage growth value as a function of the laser forage data and the ultrasonic forage data with the processing unit.

Other aspects, features, and advantages of the illustrative embodiments will become apparent with reference to the drawings and detailed description that follow.

DETAILED DESCRIPTION OF ILLUSTRATIVE EMBODIMENTS

In the following detailed description of non-limiting, illustrative embodiments, reference is made to the accompanying drawings that form a part hereof. Other embodiments may be utilized, and logical, structural, mechanical, electrical, and chemical changes may be made without departing from the scope of the appended claims. To avoid detail not necessary to enable those skilled in the art to practice the embodiments described herein, the description may omit certain information known to those skilled in the art. The following detailed description is non-limiting, and the scope of the illustrative embodiments are defined by the appended claims. As used herein, unless otherwise indicated, "or" does not require mutual exclusivity.

Figure 1:
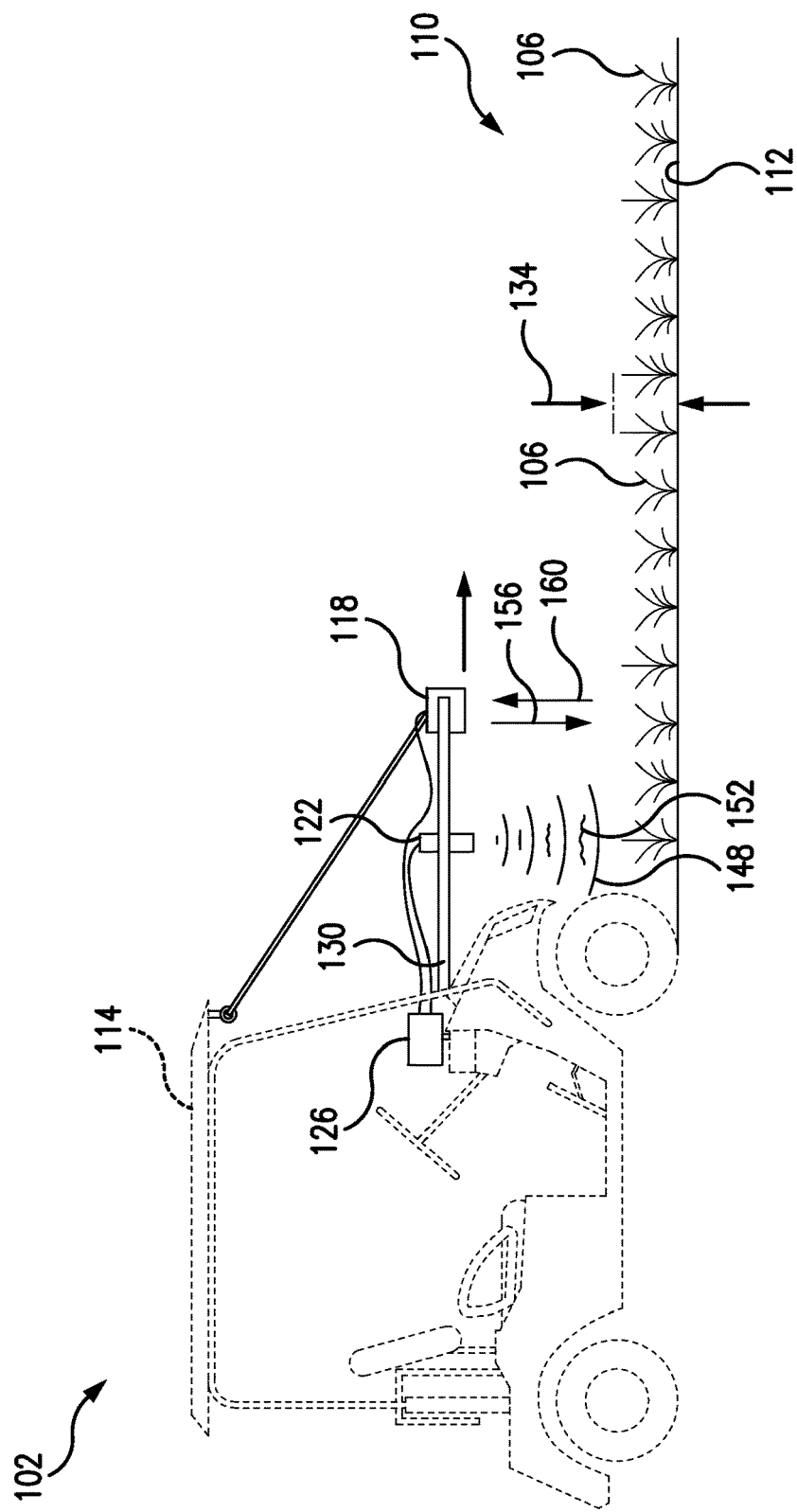
FIG. 1 shows a side view of an illustrative embodiment of a system for estimating forage growth at an area of interest.
Figure 2:
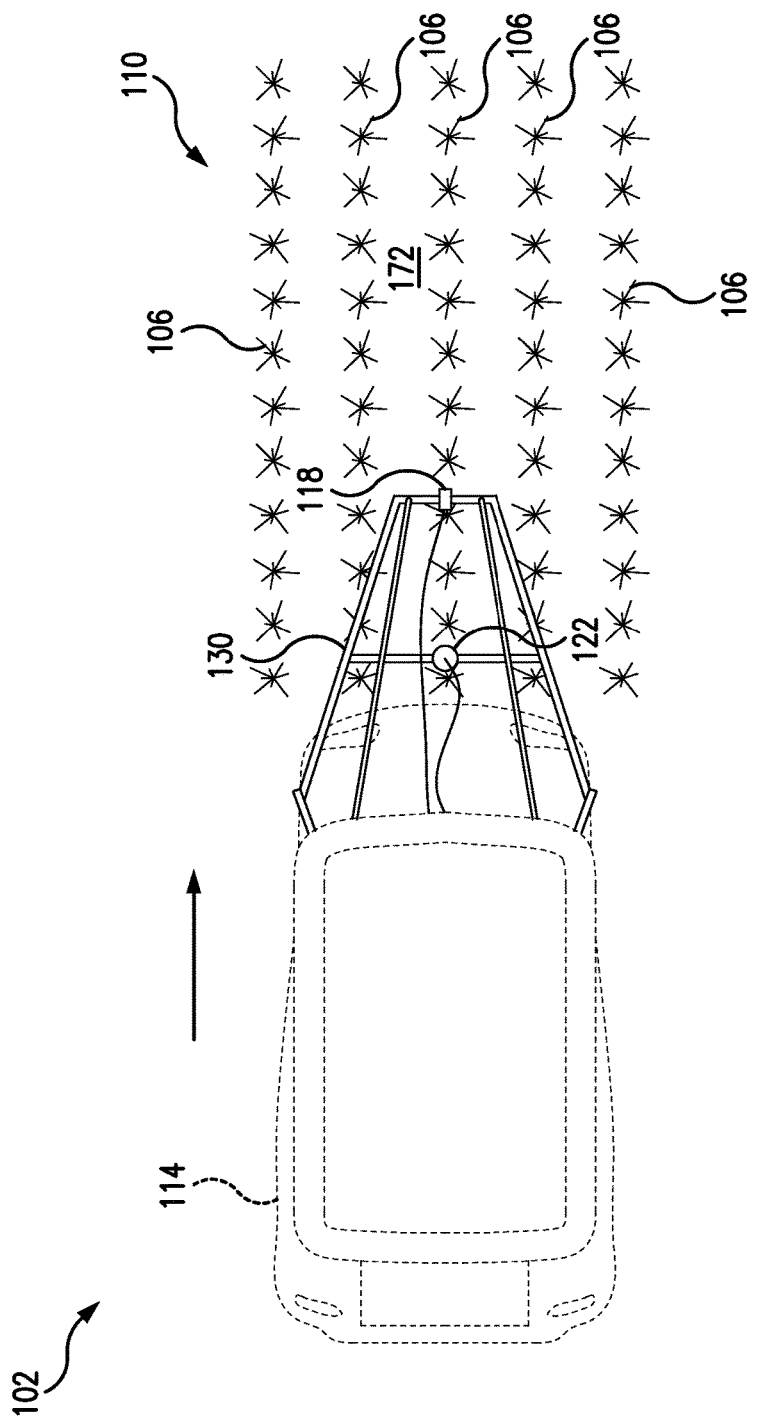
FIG. 2 shows a top view of the system depicted in FIG. 1.

Referring to FIGS. 1-2, in some illustrative embodiments, a system 102 for estimating forage growth 106 at an area of interest 110 may include a mobile support 114, a laser sensor 118, an ultrasonic sensor 122, and a processing unit 126. The laser sensor 118 may be supported by the mobile support 114, and may be configured or positioned to sense the forage growth 106 at the area of interest 110 to generate laser forage data corresponding to the forage growth 106. The ultrasonic sensor 122 may be supported by the mobile support 114, and may be positionally associated with the laser sensor 118 on a sensor array 130, for example. The ultrasonic sensor 122 may be configured or positioned to sense the forage growth 106 at the area of interest 110 to generate ultrasonic forage data corresponding to the forage growth 106.

The processing unit 126 may be in communication with or otherwise be configured to receive the laser forage data from the laser sensor 118 and the ultrasonic forage data from the ultrasonic sensor 122. In some embodiments, the processing unit 126 may be a single processing unit in communication with both the laser sensor 118 and the ultrasonic sensor 122. In other embodiments, the processing unit 126 may be multiple processing units. For example, one of the processing units 126 may be in communication with the laser sensor 118 and another of the processing units 126 may be in communication with the ultrasonic sensor 122. In some embodiments, the laser sensor 118 may carry one of the processing units 126 onboard. Similarly, in some embodiments, the ultrasonic sensor 122 may carry another of the processing units 126 onboard. Further, the processing unit 126 may be configured with, for example, a software program to determine a measured forage growth value as a growth function or a function of contributions from the laser forage data and the ultrasonic forage data as described further herein.

Continuing with FIGS. 1-2, the forage growth 106 may correspond to a forage height 134 at the area of interest 110. The mobile support 114 may be configured to move relative to the area of interest 110 over the forage growth 106 and the forage height 134. As shown, the mobile support 114 may be a vehicle, such as a golf cart. However, in other embodiments, the mobile support 114 may be, without limitation, a tractor, implement, or other structure capable of moving relative to the area of interest 110. Further, in some embodiments, the mobile support 114 may be configured to travel at a substantially constant speed between about 1.0 km/hr to about 5.0 km/hr relative to the area of interest 110.

Figure 3:
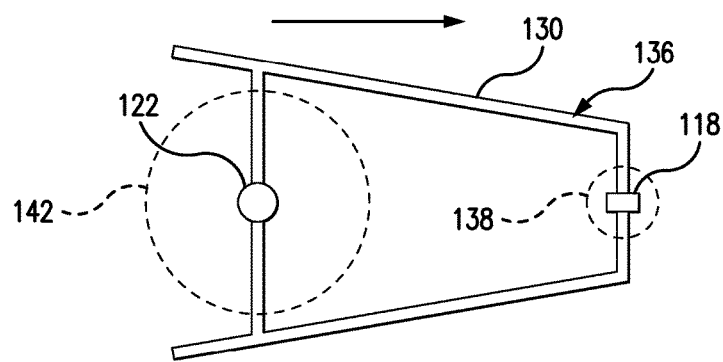
FIG. 3 shows a top, detail view of an illustrative embodiment of sensor array shown in FIG. 1, depicting an illustrative embodiment of a laser sensing footprint of a laser sensor relative to an illustrative embodiment of an ultrasonic sensing footprint of an ultrasonic sensor.

Referring to FIGS. 2-3, the ultrasonic sensor 122 and the laser sensor 118 may each be positioned on the sensor array 130. The sensor array 130 may have a planar area 136 between about 0.01 square meters to about 0.15 square meters.

Referring to FIG. 3, in some embodiments, the laser sensor 118 may be configured to have a laser sensing footprint 138 at the area of interest 110 between about 2 millimeters to about 5 millimeters across. In some embodiments, the ultrasonic sensor 122 may be configured to have an ultrasonic sensing footprint 142 at the area of interest 110 between about 7.5 centimeters to about 15 centimeters across. Further, in some embodiments, the laser sensing footprint 138 may be smaller than the ultrasonic sensing footprint 142. The laser sensing footprint 138 and the ultrasonic sensing footprint 142 may each be determined by selecting and positioning the laser sensor 118 and the ultrasonic sensor 122 relative to one another as described herein.

Figure 4:
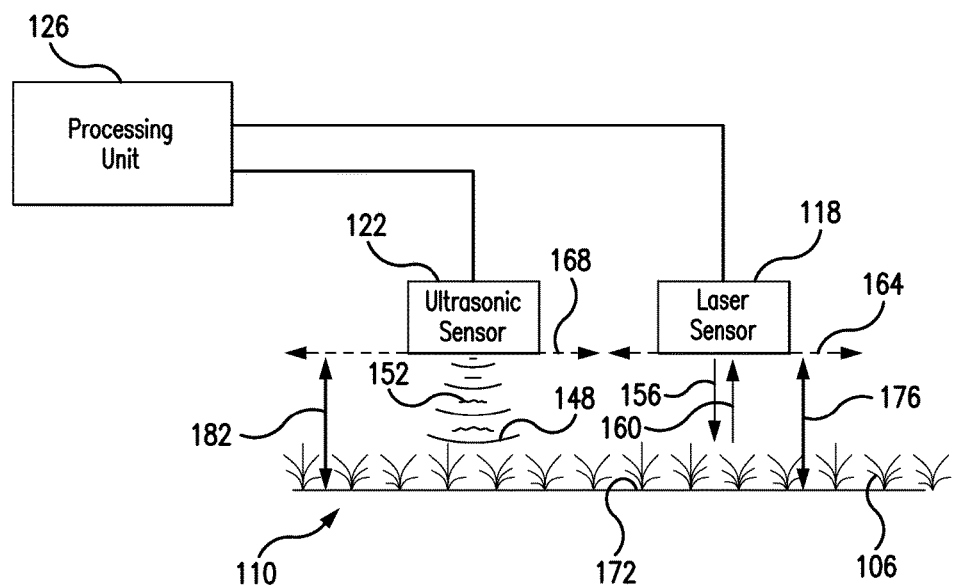
FIG. 4 shows a block diagram of an illustrative embodiment of a system for estimating forage growth at an area of interest, depicting an illustrative embodiment of an ultrasonic sensor and a laser sensor sensing the forage growth and communicating with an illustrative processing unit.

Referring to FIG. 4, in some embodiments, the ultrasonic sensor 122 may have a signal frequency of 120 Mhz. Further, the ultrasonic sensor 122 may be configured to sense a time of flight between a transmitted sound signal 148 from the ultrasonic sensor 122 and a received sound signal 152 generated by a reflection of the transmitted sound signal 148 back to the ultrasonic sensor 122. In some embodiments, the ultrasonic sensor 122 and the laser sensor 118 may each be configured to sense the forage growth 106 at a sampling rate up to 20 Hz.

The laser sensor 118 may comprise a single laser beam having a single wavelength. In some embodiments, the laser sensor 118 may operate at a single wavelength of about 660 nm. For example, the laser sensor 118 may be a single beam laser sensor configured to sense a time of flight between a transmitted light signal 156 from the laser sensor 118 and a received light signal 160 generated by a reflection of the transmitted light signal 156 back to the laser sensor 118. In some embodiments, the laser sensor 118 may have a red beam, which may enhance the contrast of the laser beam against the forage being measured for improving accuracy.

As shown in FIG. 4, the laser sensor 118 may be positioned in a first plane 164 and the ultrasonic sensor 122 may be positioned in a second plane 168. In some embodiments, the laser sensor 118 may be configured to sense the forage growth 106 substantially perpendicular to the first plane 164, and the ultrasonic sensor 122 may be configured to sense the forage growth 106 substantially perpendicular to the second plane 168. Further, in some embodiments, the laser sensor 118 in the first plane 164 may be positioned coplanar with the ultrasonic sensor 122 in the second plane 168. However, in other embodiments, the first plane 164 may not be coplanar with the second plane 168, and the laser sensor 118 and the ultrasonic sensor 122 may be calibrated appropriately to account for such differences as described below. Further, in some embodiments, the laser sensor 118 may be positioned at a fixed angle relative to the area of interest 110. Further, in some embodiments, the laser sensor 118 may be positioned between about 2 inches to about 14 inches from the ultrasonic sensor 122.

In some embodiments, the laser sensor 118 may be calibrated to have a minimum value at a surface 172 of the area of interest 110 and a maximum value at a laser supported height 176 above the area of interest 110. Thus, the laser forage data may be inversely proportional to the forage growth 106. In some embodiments, the ultrasonic sensor 122 may be calibrated to have a maximum value at the surface 172 of the area of interest 110 and a minimum value at an ultrasonic supported height 182 above the area of interest 110. Thus, the ultrasonic forage data may be directly proportional to the forage growth 106.

The laser sensor 118 may be configured to sense multiple laser forage data points corresponding to the forage growth 106, and the ultrasonic sensor 122 may be configured to sense multiple ultrasonic forage data points corresponding to the forage growth 106. The laser sensor 118 and the ultrasonic sensor 122 may be moveable relative to the area of interest 110, for example, with the moveable support 130. In some embodiments, the laser sensor 118 may be configured to sense between about 4 to about 5 laser forage data points per meter of movement relative to the area of interest 110. Similarly, in some embodiments, the ultrasonic sensor 122 may be configured to sense between about 4 to about 5 ultrasonic forage data points per meter of movement relative to the area of interest 110.

In some embodiments, the processing unit 126 may be configured to associate a laser sensed time with each of the laser forage data points and an ultrasonic sensed time with each of the ultrasonic forage data points. Further, in some embodiments, the processing unit 126 may be further configured to synchronize the laser forage data points at the laser sensed time with the ultrasonic forage data points at the ultrasonic sensed time to enhance accuracy.

Figure 5:
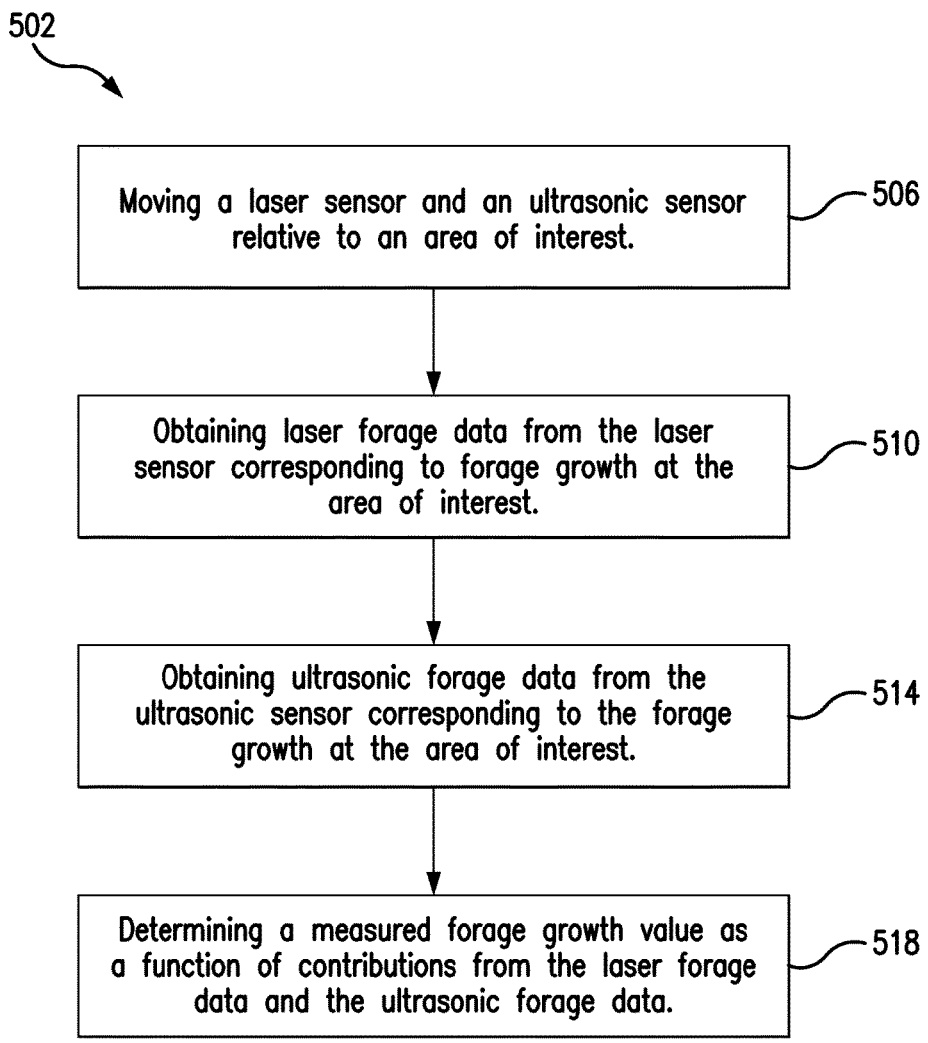
FIG. 5 shows a flow chart of an illustrative embodiment of a method of computing forage growth at an area of interest.

Referring to FIG. 5, in some illustrative embodiments, a method 502 of computing the forage growth 106 at the area of interest 110 may include a step 506 of moving the laser sensor 118 and the ultrasonic sensor 122 relative to the area of interest 110. The method 502 may further include a step 510 of obtaining laser forage data from the laser sensor 118 at, for example, the processing unit 126. The laser forage data may correspond to the forage growth 106 at the area of interest 110. The method 502 may further include a step 514 of obtaining the ultrasonic forage data from the ultrasonic sensor 122 at, for example, the processing unit 126. The ultrasonic forage data may correspond to the forage growth 106 at the area of interest 110. The method 502 may further include a step 518 of determining a measured forage growth value as a function of contributions from the laser forage data and the ultrasonic forage data with, for example, the processing unit 126. The steps in the method 502 may be performed without limitation in any suitable order.

In some embodiments, the step 510 of obtaining the laser forage data and the step 514 of obtaining the ultrasonic forage data may each include sensing the forage growth 106 at a sampling rate up to 20 Hz. In some embodiments, the step 518 of determining the measured forage growth value may weight the laser forage data greater than the ultrasonic forage data. Further, in some embodiments, the laser forage data may contribute more to the measured forage growth value than the ultrasonic forage data.

In some embodiments, the method 502 may further include positioning the laser sensor 118 in the first plane 164, and positioning the ultrasonic sensor 122 in the second plane 168. In such embodiments, the laser sensor 118 may be configured to sense the forage growth 106 substantially perpendicular to the first plane 164, and the ultrasonic sensor 122 may be configured to sense the forage growth 106 substantially perpendicular to the second plane 168. In some embodiments, the method may further include positioning the laser sensor 118 at a fixed angle relative to the area of interest 110.

In some embodiments, the method 502 may further include calibrating the laser sensor 118 to have a minimum value at the surface 172 of the area of interest 110 and a maximum value at a laser supported height 176 above the area of interest 110. In such embodiments, the laser forage data may be inversely proportional to the forage growth 106. In some embodiments, the method 502 may further include calibrating the ultrasonic sensor 122 to have a maximum value at the surface 172 of the area of interest 110 and a minimum value at an ultrasonic supported height 182 above the area of interest 110. In such embodiments, the ultrasonic forage data may be directly proportional to the forage growth 106.

Figure 6:
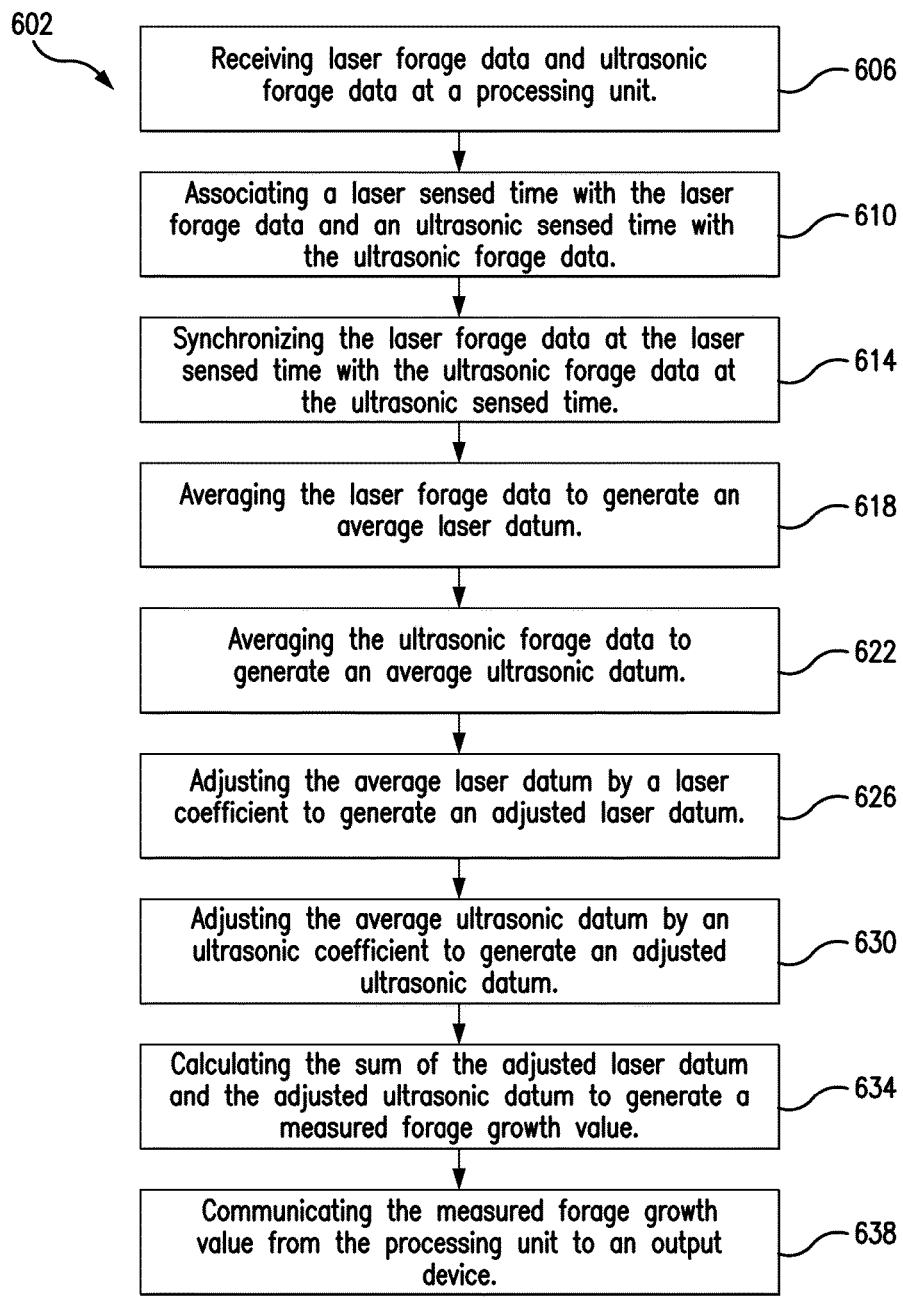
FIG. 6 shows a flow chart of an illustrative embodiment of a method of determining a measured forage growth value.

Referring to FIG. 6, in some illustrative embodiments, a method 602 of generating or determining the measured forage growth value may include a step 606 of receiving the laser forage data and the ultrasonic forage data at the processing unit 126. The laser sensor 118 may be configured to sense multiple laser forage data points corresponding to the forage growth 106, and the ultrasonic sensor 122 may be configured to sense multiple ultrasonic forage data points corresponding to the forage growth 106.

In some embodiments, the method 602 may further include a step 610 of associating a laser sensed time with each of the laser forage data points, and an ultrasonic sensed time with each of the ultrasonic forage data points. In some embodiments, the method 602 may further include a step 614 of synchronizing the laser forage data points at the laser sensed time with the ultrasonic forage data points at the ultrasonic sensed time. The steps 610, 614 may be optional and may enhance accuracy.

Continuing with FIG. 6, the method 602 may further include a step 618 of averaging the laser forage data to generate or provide an average laser datum, and a step 622 of averaging the ultrasonic forage data to generate or provide an average ultrasonic datum. The method 602 may further include a step 626 of adjusting the average laser datum by a laser coefficient to generate an adjusted laser datum. The step 626 of adjusting the average laser datum may include multiplying the average laser datum by the laser coefficient to generate the adjusted laser datum. The method 602 may further include a step 630 of adjusting the average ultrasonic datum by an ultrasonic coefficient to generate or provide an adjusted ultrasonic datum. The step 630 of adjusting the average ultrasonic datum may include multiplying the average ultrasonic datum by the ultrasonic coefficient to generate the adjusted ultrasonic datum. The method 602 may further include a step 634 of calculating the sum of the adjusted laser datum and the adjusted ultrasonic datum to generate the measured forage growth value. The method 602 may further include the step 638 of communicating the measured forage growth value from the processing unit 126 to an output device (not shown). In some embodiments, the laser coefficient may be greater than the ultrasonic coefficient such that the laser forage data is weighted more than the ultrasonic forage data in the growth function.

In some embodiments, the step 618 of averaging the laser forage data may include calculating the sum of the laser forage data points; determining a total number of the laser forage data points; and dividing the sum of the laser forage data points by the total number of the laser forage data points. In some embodiments, the step 622 of averaging the ultrasonic forage data may include calculating the sum of the ultrasonic forage data points; determining a total number of the ultrasonic forage data points; and dividing the sum of the ultrasonic forage data points by the total number of the ultrasonic forage data points. The steps in the method 602 may be performed without limitation in any suitable order.

Figure 7:
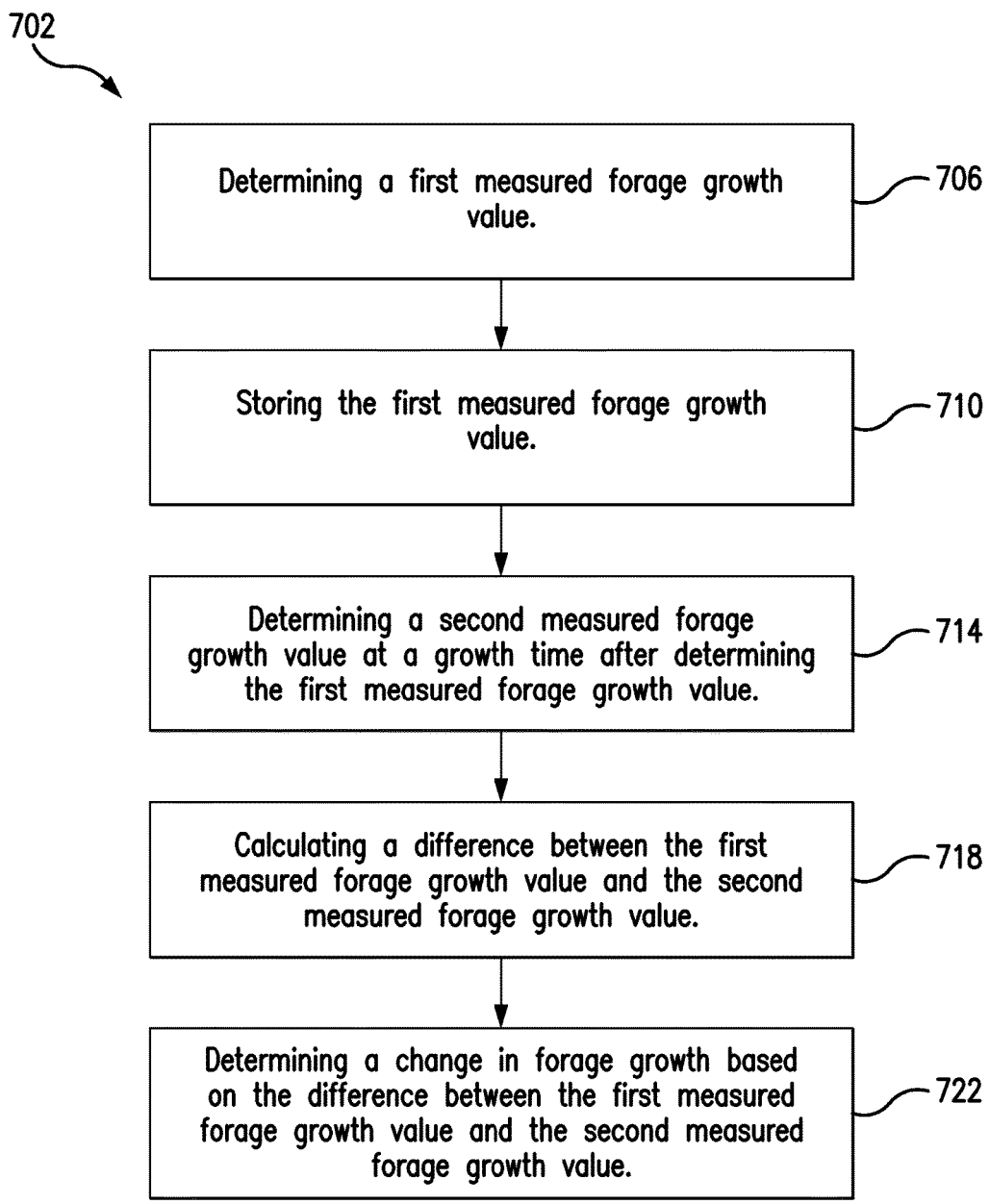
FIG. 7 shows a flow chart of an illustrative embodiment of a method of determining a change in forage growth.

Referring to FIG. 7, in some illustrative embodiments, a method 702 of determining a change in the forage growth may include a step 706 of determining a first measured forage growth value. The method 702 may further include a step 710 of storing the first measured forage growth value, and a step 714 of determining a second measured forage growth value as a growth function or a function of contributions from the laser forage data and the ultrasonic forage data at a growth time after determining the first measured forage growth value. The method 702 may further include a step 718 of calculating a difference between the first measured forage growth value and the second measured forage growth value, and a step 722 of determining a change in forage growth based on the difference between the first measured forage growth value and the second measured forage growth value. The steps in the method 702 may be performed without limitation in any suitable order.

Figure 8:
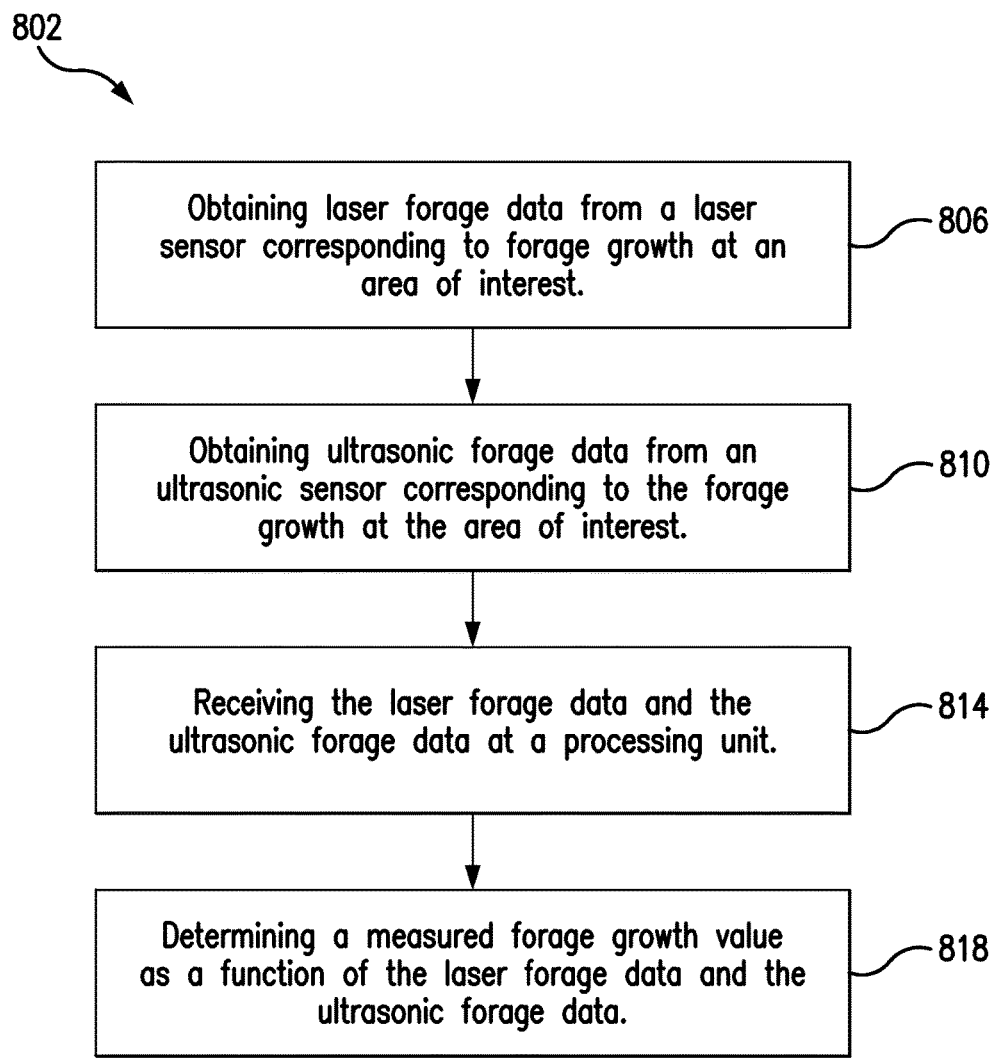
FIG. 8 shows a flow chart of another illustrative embodiment of a method of computing forage growth at an area of interest.
Figure 9:
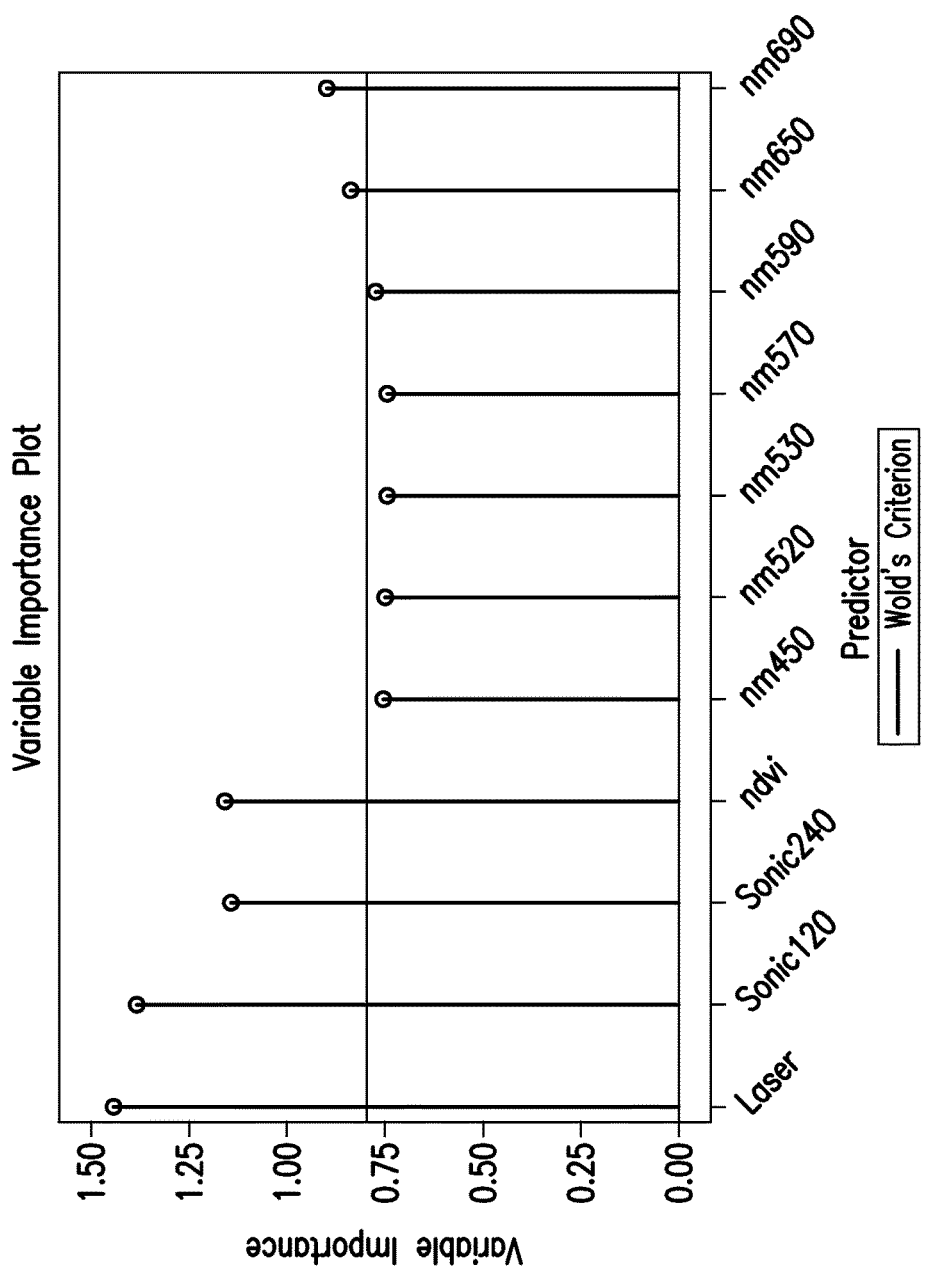
FIG. 9 shows a variable importance plot for variable exclusion/inclusion in dry biomass estimation model construction.

Referring to FIG. 8, in some illustrative embodiments, a method 802 of computing the forage growth 106 at the area of interest 110 may include a step 806 of obtaining the laser forage data from the laser sensor 118 corresponding to the forage growth 106 at the area of interest 110; a step 810 of obtaining the ultrasonic forage data from the ultrasonic sensor 122 corresponding to the forage growth 106 at the area of interest 110; a step 814 of receiving the laser forage data and the ultrasonic forage data at the processing unit 126; and a step 818 of determining a measured forage growth value as a function of the laser forage data and the ultrasonic forage data with the processing unit 126. The steps in the method 802 may be performed without limitation in any suitable order.

Although this specification discloses advantages in the context of certain illustrative, non-limiting embodiments, various changes, substitutions, permutations, and alterations may be made without departing from the scope of the appended claims. Further, any feature described in connection with any one embodiment may also be applicable to any other embodiment. Further, the following Addendum provides additional description, testing, and support for the devices, systems, and apparatus described herein.

EXAMPLES

Estimation of Biomass Using Ultrasonic and Laser Sensors

1. Introduction

An effective method for in-field estimation of biomass on a dry matter (DM) basis must be approximately as accurate as the accepted standard for destructive removal measurement. Non-destructive methods for estimating dry biomass have been developed using plant or canopy measurements [1, 2]. In large part, vegetative mass is considered a function of canopy or plant height [3,4]. Subsequently, an estimate of canopy or plant height is recorded and an empirical relationship can be created between height and DM. Devices such as the rising plate meter, capacitance meter, and meter stick are typically implemented for physical measurements of vegetation height [1,5,6,7]. The limitations associated with these techniques are labor and time needed to collect the measurements. Additionally, challenges can be encountered in representation of variation due to vegetation growth characteristics and spatial variability. This may present difficulty in creating a robust estimation model, which is representative for a comprehensive range of dry biomass volumes that may be encountered.

Alternatively, remote sensing strategies (ultrasonic, laser, and sensor combinations) may overcome some of the limitations encountered with physical measurement strategies. Many more measurements can be taken in a considerably smaller amount of time and generally a much larger area can be sampled. This increased magnitude in data collection provides opportunity for development of a statistically robust estimation model as a more comprehensive representation of the area of interest (AOI) can be collected.

1.1. Ultrasonic

Ultrasonic proximity sensors employ intensity differential reflectance of sound waves to approximate distances. Ultrasonic sensors have been utilized for measuring height and estimating DM in pastures [2,8,9], canopy characterization in orchards [10,11], phyto-sanitary tissue in viticulture [12], as well as crop production scenarios in wheat (*Triticum aestivum* L.) [13], cotton (*Gossypium hirsutum* L.) [14], and corn (*Zea mays* L.) [15].

1.2. Laser

Laser proximity sensors employ time differential reflectance of light to approximate distances. Laser sensors have been effectively used for height measurements in wheat [16,17], corn [18], rape (*Brassica napus* L.), rye (*Secale cereale* L.), pasture [19], standing forests [20], and miscellaneous vegetation [21].

1.3. Sensor Combinations

Fricke [2] examined the combination of ultrasonic and active spectral reflectance for accuracy in white clover (*Trifolium repens* L.), red clover (*Trifolium pratense* L.), alfalfa (*Medicago sativa* L.) with perennial ryegrass (*Lolium perenne* L.) for dry biomass estimation. Fricke [2] reported $R^2=0.99$ in estimation of biomass for monoculture alfalfa and 0.90 in alfalfa perennial ryegrass mixtures. Scotford [22] reported standard errors between 4.6 and 7.2 cm estimation of canopy height in wheat when combining ultrasonic and Normalized Difference Vegetation Index (NDVI). Similar examinations were made in corn by Freeman [23] using NDVI and ultrasonic sensors where an $R2=0.62$ was reported for forage mass.

1.4. Spectral Strategies

Spectral strategies seek to base estimations on reflectance or absorption intensities of wavelengths from vegetation and/or soil [24, 25, 26, 2]. This is an effective strategy but can become less accurate upon full canopy closure when a point of reflectance saturation may occur [27, 24]. Some direct contribution to spectral saturation can be attributed to increase in vegetation height, but calibration curves for spectral indices vary in a logarithmic pattern to dry biomass signifying an interaction of canopy closure and height [23, 28]. Subsequently, canopy closure early in vegetative development, may limit spectral methods for biomass estimation. Normalized Difference Vegetative Index in particular has been employed for biomass estimation for a number of crop species. Freeman [23] employed an active NDVI sensor and recorded a positive relationship with $R^2=0.52$ for forage DM yield in corn. Erdle [24] reported $R^2$ values of up to 0.91 and 0.84 for nitrogen content and biomass for wheat, respectively, when using active spectral sensors for NDVI measurement. Additionally, Gnyp [27] observed $R^2$ of up to 0.69 for above-ground biomass in rice (*Oryza sativa* L.) when regressed with NDVI alone. Gnyp [27] also noted a 21-35% increase in explanation of above-ground biomass in rice when using a six-band spectral model as compared to NDVI alone.

There is limited published research on the combined use of ultrasonic and laser sensors and their subsequent estimation models to measure forage height and DM. Therefore, the objectives of this research were to evaluate the relationship between a combination of sensor measured canopy height and spectral reflectance with the corresponding dry biomass measured via destructive removal. The evaluation was achieved by collecting both physically-measured and sensor-measured plant canopy heights as well as active and passive spectral reflectance readings via a mobile platform for vegetation at the canopy level. In addition, data acquisition with commercially available software (WinWedge Pro©, TAL Technologies Inc., Philadelphia, Pa.) and custom software (SDLogger) designed to accommodate a high throughput data acquisition dynamic were evaluated. The end goal of this research was to assemble a system containing a collection of sensors and software, which would enable efficient and accurate acquisition of data by which estimation of dry biomass could be achieved.

2. Materials and Methods 2.1 Alfalfa-Bermudagrass Mixture Experiment

The alfalfa (*Medicago sativa* L. '600RR')-bermudagrass [*Cynodon dactylon* (L.) Pers. 'Midland 99'] mixture trial was conducted at the Noble Foundation Red River Research and Demonstration Ranch near Burneyville, Okla. (33.88° N, 97.28° W; elevation 234 m.). The soils are characterized as Slaughterville fine sandy loam (coarse-loamy, mixed, superactive, thermic Udic Haplustolls) with N-nitrate at less than 5 g kg$^{-1}$, soil test P value of 64 g kg$^{-1}$, K of 52 g kg$^{-1}$ (amended 178.5 g kg$^{-1}$ 0-0-60), B of 0.17 mg kg$^{-1}$ (amended 74.5 mg kg$^{-1}$) and pH of 6.3.

A Hege 1000 cone planter no-till drill (Hege Equipment Inc., Colwich, Kans.) was used for inter-seeding alfalfa into an established bermudagrass sward in fall of 2012 and spring of 2013. Data was collected the following spring and summer of each establishment year. Treatments were arranged in eight replications of a randomized complete block design with a split-split-plot arrangement. Main plots consisted of three alfalfa planting dates (September, November, and February), subplots consisted of three alfalfa seedbed preparations (mow/hay-off, mow/hay-off plus glyphosate, and tillage), and sub-subplots (1.5×6 m) consisted of seven fungicide and insecticide alfalfa seed treatments. An adjacent experiment with eight replicates of 1.5×6 m bermudagrass only plots treated with seven different levels of N fertilizer ranging from 0 to 224 g kg$^{-1}$ N was established and harvested concurrently with the alfalfa-bermudagrass mixture experiment.

2.1.1. Physical Measurements

Data was collected from all plots four times (May, June, August, and October) in 2013 when alfalfa presented at least 10% bloom. Vegetation height measurements were taken using a meter stick and a 0.1-m$^2$ aluminum rising plate disk meter (NZ Agriworks LTD t/a Jenquip, Feilding, NZ) [29, 30, 31]. Species composition was estimated both visually and as hand-separated dry weights from harvested quadrats for the alfalfa and bermudagrass mixtures only [32]. Visual composition was estimated and averaged across three observers [33]. Hand-separated alfalfa and bermudagrass subsamples were dried in a forced draft oven at 50° C. for 7 days to a constant weight prior to weighing. Plot biomass weights were recorded on a whole plot basis and are reported on a dry matter basis.

2.1.2. Sensor Measurements

A ground-based mobile platform was utilized for moving sensors across the trial areas using an electric golf cart fitted with drop spindles and oversized tires spaced at 1 m apart to minimal contact to the biomass contained within the plot area (1.5×6 m). The cart was custom-fitted with a mast extending from the front upon which all sensors were attached. A single deep cycle 12 VDC marine battery was added to the cart and served as the power source for all sensors. Power and/or accessory power to all sensors was routed through a system power cycle switch by which all active data acquisition could be initiated or terminated simultaneously.

2.1.3. Position

A GPS with OmniStar XP GNSS positioning was implemented to acquire position data for all sensor readings. The GPS was configured to output spatial data at a rate of 10 Hz such that multiple locations could be recorded within each plot.

2.1.4. Height

Height was measured using a single beam 660 nm time of flight laser distance sensors. The sensor was calibrated at bare ground surface and 93 cm as minimum and maximum heights, respectively, with a rising slope such that readings were inversely related to change in height ("Laser"). The laser sensor used in this experiment differs from Lidar laser systems which are typically aerial-based or ground-based static as opposed to mobile. Additionally, Lidar laser systems typically utilize a large number of reflectance beams at numerous wavelengths which produce a "point cloud" [17, 18]. The laser distance sensor used in these experiments emitted only one beam at one wavelength to produce a linear pattern of measurements and did not have the multidimensional dynamics of a Lidar point cloud. The laser produced readings based on a 2- to 5-mm footprint, which was inversely proportional to vegetation height.

Ultrasonic sensors operating at different frequencies were examined to observe which if either was appropriate for use on plant material. Subsequently, height measurements were collected using a 240 MHz ultrasonic sensor ("Ultrasonic 1"), which was also calibrated at ground height and 93 cm but with a falling slope calibration such that height measurements were directly proportional to change in height. Additionally, a 120 MHz ultrasonic sensor ("Ultrasonic 2") with the same calibration specifications was also used. Ultrasonic sensors 1 and 2 collected readings based on a 7.5- to 15-cm footprint, which were also inversely proportional to vegetation height. As the calibration for height sensors was 0-93 cm, both were operated within effective detection limits of near 0 mm to 10 m specified by the manufacturer. All height data were acquired at a rate of 50 Hz with sensors configured to collect data centered on a 0.12-m$^2$ area.

2.1.4. Spectral Reflectance

An active field radiometer was employed to collect reflectance readings for calculation of NDVI. Data were acquired at rate of 20 Hz from the active radiometer for each plot. Additionally, a passive field radiometer was also used and acquired reflectance measurements at 450, 520, 530, 570, 590, 650, 690, 710, 780, and 900 nm. Sampling using the passive radiometer was limited to two readings per plot as sampling time was approximately two to three seconds per acquisition. The number of passive readings (2 per plot) was less than active readings (80-100 per plot) since each passive acquisition required a keystroke on the laptop computer compared to an automated acquisition from the active sensor.

2.1.5. Transport and Temporal Logistics

Each plot was driven across at 3.2-4.8 km hr$^{-1}$ resulting in approximately 5 seconds of data acquisition per plot. Due to the extensive nature and magnitude of acquired data, it was assumed a representative sample of vegetation height and spectral reflectance was acquired for whole plot averaging during this acquisition window. This amount of time provided approximately 25-30 averaged values per plot per parameter (i.e. Laser 1, Laser 2, GPS, active radiometer, etc.). After removal of the ramp-up and ramp-down features associated with the power cycling, approximately 4-5 readings per linear m were acquired. One factor previously mentioned which influenced rate of travel was the time necessary for two data acquisition events to take place concerning the passive radiometer. As was previously stated, each event required two to three seconds such that approximately five seconds were necessary in order for completion of data acquisition across the length of the plot. Upon review of the patterns in data acquisition, it was apparent that some variability in the length of data acquisition time per plot occurred but only existed on the order of less than one second.

The sensor array measured approximately 25 cm wide and 45 cm from front to back with the active radiometer located most forward and the ultrasonic proximal sensors located in the rear. Due to this offset, it was necessary to ensure all sensors were oriented above the plot prior to data acquisition initiation and termination. When using the power cycle switch in combination with WinWedge Pro software null values were collected during the time spent crossing the alley area and until all sensors were oriented above the successive plot by interrupting power and/or accessory power to all sensors.

2.2. Wheat Experiment

Two wheat trials were also employed for sensor data collection. The first wheat experiment was initiated at the Noble Foundation Dupy farm near Gene Autry, Okla. (34.29° N, 96.99° W; elevation 220 m.). The soils are characterized as Dale silt loam with pH of 7.3 and N-nitrate, P, and K of 14, 31, and 132 g kg$^{-1}$, respectively. A Hege 500 cone planter grain drill (Hege Equipment Inc., Colwich, Kans.) was used for planting wheat in autumn of 2013, while data was collected in the spring of 2014. Approximately 1200 (1.5×3 m) plots of various wheat varieties were planted as part of variety selection trials. These were arranged in a two replication RCBD design.

The second wheat experiment was initiated at the Noble Foundation Unit 3 farm in Ardmore, Okla. (34.17° N, 97.08° W; elevation 268 m.). The soils are characterized as Konsil loamy fine sandy with pH of 6.8 and N-nitrate P, and K of 28, 50, and 111 g kg$^{-1}$, respectively. This trial contained 136 (1.5×3 m) plots. A Hege 500 cone planter grain drill was also used for planting wheat in 2013, with seven data collection events occurring from February to April of 2014.

2.2.1. Physical Measurements

Wheat biomass weights were estimated by hand clipping a 0.16 m$^2$ quadrat which were dried at were dried in a forced draft oven at 50° C. for 7 days prior to weighing and reported as kg ha$^{-1}$ on DM basis 2.2.2. Sensor Measurements Sensor data was collected from the wheat trials using a gasoline-powered Spider high-clearance tractor (LeeAgra, Inc., Lubbock, Tex.) at a ground speed of approximately 1.6-3.2 km h$^{-1}$. The factory installed spray mast attached to the front of the tractor was converted to a manifold configuration to accommodate the sensor array. All sensors were initially powered using the onboard factory installed 12 V power supply. This was though modified to include an independent 12 V power source since restarting the gasoline engine created a momentary power deficit which required re-starting the sensor system.

2.2.3. Position

The same GPS with OmniStar XP GNSS positioning as described in the alfalfa and bermudagrass trial was implemented to acquire position data for all sensor readings. The GPS was configured to output spatial data at a rate of 10 Hz such that multiple locations could be recorded within each plot.

2.2.4. Height

Height was measured using two single 660 nm beam time of flight laser distance sensors. Both were calibrated at bare ground surface and a 74 cm maximum, with a rising slope such that readings were inversely related to change in height. Additionally, a 120 MHz ultrasonic sensor was calibrated at a bare ground surface and a 74 cm maximum, respectively, with a falling slope such that readings were directly related to change in height. Laser sensors collected readings based on a 2- to 4-mm footprint, which was inversely proportional to vegetation height. The ultrasonic sensor collected readings based on a 7.5- to 12-cm footprint, which were also inversely proportional to vegetation height. All height sensors were operated within effective detection limits of near 0 mm to 10 m specified by the manufacturer. All height data were acquired at a rate of 10 Hz and all sensors were configured to collect data centered on a 0.02-m$^2$ area.

2.2.5. Spectral Reflectance

An active field radiometer was employed to collect reflectance readings for calculation of NDVI. Data were acquired at rate of 10 Hz from the active radiometer for each plot.

2.2.6. Transport and Temporal Logistics

The sensor array measured approximately 20 cm long by ten cm wide. As was previously described in experiment 1, it was necessary to ensure all sensors were transported to an orientation above the plot prior to data acquisition initiation and termination. Alley identifiers were collected (using SD logger) during the time spent crossing the alley areas and until all sensors were oriented above the successive plot whereas plot identifiers were real time assigned to the incoming data.

Each plot was driven across at 1.6-3.2 km hr$^{-1}$ resulting in approximately 3 seconds of data acquisition per plot. This amount of time provided approximately 25-30 sampled (using SDlogger) values per plot per parameter (i.e. Laser 1, Laser 2, GPS, active radiometer, etc.). Variability in the length of data acquisition time per plot occurred but was similar to the cart configuration in the alfalfa and bermudagrass experiment and only existed on the order of less than one second.

2.3. Data Acquisition Hardware—All Experiments

For all experiments, analog data from the four height measurement sensors were acquired using a data acquisition module (DAQ). Laser sensors were configured via a current loop to operate at a range of 0 to 5 VDC and were connected directly to the DAQ for voltage output acquisition. The 120 MHz ultrasonic sensor was configured to operate at a range of 0 to 5 VDC and voltage readings were directly output to the DAQ. The 240 MHz ultrasonic sensor was operated at a range of 0 to 10 VDC and voltage readings were directly output to the DAQ. From the DAQ, all analog data was transferred as digital output to a laptop computer via USB connection. Data from the active radiometer was output directly to the laptop computer via serial connection as NDVI values, which were generated by the autonomous radiometer processor. Passive spectral readings were acquired and stored in the autonomous memory contained within the passive radiometer hardware. It was not possible to insert plot markers into data from the passive radiometer as it was necessary for the power source in this unit to remain autonomous and operational function could only be achieved through use of the factory included software. However, it was possible to operate this software simultaneously on the same laptop, which was used for all other data acquisition.

2.4. Data Acquisition Software—All Experiments

For all experiments, all streams of data were captured real-time using SDlogger and WinWedge Pro. These software applications were not used simultaneously for concurrent data collection. Both applications allowed for recording each stream of data with unique configurations for interfacing with each sensor. Unique configurations were necessary as retention of all data fields from all sensors was not desired and communication configurations for each stream of data or sensor were different.

2.4.1 Logic and Output

SDlogger was developed to utilize a sampling logic which resulted in only the user specified rate of data acquisition to take place. All data was written to a single log file at the user specified rate. In contrast Winwedge Pro captured all data from incoming streams at rates dictated by the transmitting hardware. When using WinWedge Pro it was necessary to run multiple instances of the software simultaneously, one for each stream of data (i.e. DAQ, GPS, active radiometer). Each instance of the software produced one log file for the data stream being acquired, which resulted in multiple output files for each data collection event.

2.4.2. Plot Vs. Non-Plot Delineation

The power cycling switch used for plot delineation when acquiring data with WinWedge pro at no point interrupted data streams. Subsequently as the power was cycled on sensor readings were acquired and null readings were acquired when power was cycled off. These areas of null values signified non-plot areas. This strategy required combining the data from all streams post-processing. Conversely, SDlogger enabled the user to insert identifiers real-time as the data were acquired via a mouse click or touch screen button in order to delineate plot areas from non-plot areas.

2.4.3. Passive Radiometer Data Acquisition

As was previously noted, data acquired from the passive radiometer was written to the autonomous storage capabilities contained within the unit. A hardware-specific software application was necessary to extract and post-process readings from the passive radiometer as relative reflectance. This application produced one log file which could then be combined with data from all other sensors at post-processing based on sampling rate per plot and time stamp.

2.5. Data Post-Processing

For both applications, time and date fields (based on the laptop clock) were inserted into the data streams for each record received at the application level. This allowed for quality control and the ability to combine the data during post-processing when using WinWedge Pro.

2.5.1 WinWedge Pro

Combining log files produced when using WinWedge Pro was achieved through implementation of a custom post-processing application (DataProcessing). The primary function of the DataProcesing application was averaging data to a desired rate (i.e. 5 Hz, 10 Hz, etc.) so as to balance the number of sensor readings across the sensors and compress data to a more manageable volume. The averaging was achieved by utilization of the aforementioned time stamp which had been inserted for each record. After the data was combined it was output to a text file which contained the combined sensor data at the specified averaging interval (i.e. 5 Hz, 10 Hz, etc.). The output file from the DataProcesing software was then manually edited by attaching range and row identifiers to plot areas. These plot areas were delineated based on the aforementioned null values. Subsequently the non-plot areas were manually removed from the data, leaving only the range and row identified plot areas. These plot areas could then be assigned a unique plot identifier. A ramp-up and ramp-down feature was observed in the height data in relation to the cycling of the system power switch. This feature created an approximately 0.5 sec collection of data from the height devices that did not correspond to measurement output. It was then necessary to manually remove this approximately 0.5 sec of data from the beginning and end of each plot.

2.5.2 SDlogger

Data acquired using SDlogger was also manually edited to remove non-plot areas. Due to the user control and plot identification features provided in this software application, the magnitude of the data contained in the single output file were of a much smaller scale than that output by WinWedge Pro. This was due to the sampling logic data acquisition strategy implemented in SDlogger as opposed to the constant uncontrolled streaming of data with WinWedge Pro. A user-specified sampling rate allowed for data acquisition at rates of up to 20 Hz and output of all parameters to a single log file. Subsequently, no post-processing application was necessary for compression of the data through averaging. Due to the fact no cycling of power was necessary for plot delineation, the ramp-up and ramp-down features identified when utilizing WinWedge Pro were not present.

2.5.3 Data Transformation

Post-processing data transformation was performed on laser measurements as calibrations produced readings which were inversely proportional to the height of measured vegetation. Laser readings were subtracted from the calibrated maximum reading (signifying the greatest distance from the sensor). This transformed the data to a directly varying scale which agreed with the directly varying relationships between vegetation height and readings from ultrasonic sensors. Both ultrasonic and laser readings were converted to centimeter values based on the minimum and maximum calibration heights at post-processing.

2.6. Data Analysis—All Experiments

Sensor readings were examined for correlation to physically measured height and destructively measured DM [34, 35, 36]. The combination of output from multiple sensors as constituents of a predictive model for biomass was also examined. Comparisons were examined for the accuracy in estimation of height and DM for sensor models versus physical measurements performed. Repeatability of destructively measured DM was also examined.

2.6.1. Correlation

Correlation of the measurement methods, both physical and sensor, were examined for correlation to vegetative mass on a DM basis as well as sensor estimated height to measured canopy height (Table 1). These analyses were performed using SAS PROC CORR [37].

TABLE 1

Pearson coefficients for sensor collected parameters correlated to physical measures.

| Sensor Measurement | All | Alfalfa | Bermmudagrass | Mix | Wheat |
|---|---|---|---|---|---|
| Destructively Measured DM | | | | | |
| Measured height | 0.80 | 0.83 | 0.83 | 0.82 | |
| Plate meter | 0.41 | 0.43 | 0.48 | 0.43 | |
| Laser | 0.76 | 0.80 | 0.88 | 0.86 | 0.86 |
| 120 MHz sonic | 0.79 | 0.74 | 0.87 | 0.85 | 0.85 |
| 240 MHz sonic | 0.67 | 0.75 | 0.81 | 0.66 | |
| NDVI | 0.66 | 0.70 | 0.75 | 0.72 | 0.62 |
| 450 nm | −0.36 | −0.35 | −0.53 | −0.41 | |
| 520 nm | −0.31 | −0.33 | −0.54 | −0.36 | |

TABLE 1-continued

Pearson coefficients for sensor collected parameters correlated to physical measures.

| Sensor Measurement | All | Alfalfa | Bermmudagrass | Mix | Wheat |
|---|---|---|---|---|---|
| 530 nm | −0.28 | −0.32 | −0.51 | −0.32 | |
| 570 nm | −0.32 | −0.36 | −0.50 | −0.37 | |
| 590 nm | −0.35 | −0.41 | −0.56 | −0.38 | |
| 650 nm | −0.47 | −0.48 | −0.65 | −0.51 | |
| 690 nm | −0.51 | −0.47 | −0.63 | −0.54 | |
| Canopy Height | | | | | |
| Platemeter | 0.25 | 0.11 | 0.25 | 0.24 | |
| Laser | 0.80 | 0.83 | 0.88 | 0.78 | |
| 120 MHz sonic | 0.74 | 0.76 | 0.82 | 0.73 | |
| 240 MHz sonic | 0.70 | 0.73 | 0.71 | 0.68 | |

2.6.2. Model Construction

Estimation models were generated by including all parameters measured for biomass and canopy height in partial least squares regression using SAS PROC PLS with CVTEST and NOINT option for selection of simplest models [37, 38, 39, 40]. The PLS procedure was also selected as cross validation and model training can be used to optimize estimation accuracy. Parameters included in biomass and canopy height estimation models were selected by evaluation of Variable Importance Plot (VIP) values and Centered Scaled Parameter Estimate (CSPE) values [41] (Table 2). Laser readings as well as the ultrasonic component with highest VIP and CPSE furthest from zero were used for canopy height modeling. The same strategy was employed for biomass estimation models though inclusion of the appropriate spectral component(s) was also considered. This strategy was adopted in order to achieve an acceptable balance in estimate accuracy and model/sensor system complexity by excluding less contributive variables and equipment from the system.

TABLE 2

Centered Scaled Parameter Estimates (CPSE) and Variable Importance Plot (VIP) scores for sensor parameters considered for model inclusion.

| Sensor Measurement | CPSE | VIP |
|---|---|---|
| DM | | |
| Laser | 0.33 | 1.37 |
| 120 MHz sonic | 0.18 | 1.32 |
| 240 MHz sonic | 0.02 | 1.11 |
| NDVI | −0.07 | 1.10 |
| 690 nm | −0.26 | 0.90 |
| 650 nm | −0.09 | 0.83 |
| 590 nm | 0.10 | 0.74 |
| 450 nm | −0.06 | 0.72 |
| 520 nm | 0.08 | 0.71 |
| 570 nm | 0.04 | 0.70 |
| 530 nm | 0.07 | 0.69 |
| Canopy Height | | |
| Laser | 0.25 | 1.08 |
| 120 MHz sonic | −0.40 | 1.01 |
| 240 MHz sonic | 0.16 | 0.95 |

Models were constructed using cross validation with a 20-fold block training set and the default of 1000 permutations. Approximately two-thirds of the total data (approximately 2300 samples) were used for construction of non-species specific ("ALL") estimation models for biomass, 1095 samples for sensor-based canopy height estimates. The remaining one-third was employed as validation data. Alternatively, 212 samples were used to generate estimation models for alfalfa only, with a validation set containing 89 samples. Seventy-eight samples were used to construct the bermudagrass only model with a validation set of 32 samples. Wheat biomass models were constructed from 193 samples and validation was performed with 97 samples. Since no physically-measured canopy height data was collected for wheat, no canopy height estimation models were generated. A group of data from the alfalfa and bermudagrass trial categorized as mixture (alfalfa and bermudagrass compositions ranging from 80-20% to 20-80%, respectively, referred to as "MIX") was also evaluated for modeling from data consisting of 1002 samples and validation containing 581 samples.

2.6.3 Model Performance

Regression analyses were performed to evaluate relationships between measured and estimated values using SAS PROC REG for samples from the validation data only [37]. Regression analyses were performed for both canopy height and biomass estimations. Additionally, accuracy of estimation models was evaluated on a percent basis by examining the mean of the percent difference from each sample measurement and its associated modeled estimate (Equation 1). Agreement of measured and estimated values and variation in repeatability were examined using limits of agreement analysis (LOA) for bermudagrass plots only (113 pairs of plots) [42] (Table 3). Only bermudagrass plots were used in this analysis due to the fact that plots were homogenous and side by side such that an expectation of replication was appropriate and is a requirement for the LOA analysis [42].

TABLE 3

Dry biomass estimation model label key for sensor and physical measures.

| Model Number | Estimate | Species Specific | Number Of Sensors |
|---|---|---|---|
| 1 | Dry Biomass | Y | 3 |
| 2 | Dry Biomass | N | 3 |
| 3 | Dry Biomass | Y | 2 |
| 4 | Dry Biomass | N | 1-2 |
| 5 | Dry Biomass | Y | Meter Stick |
| 6 | Dry Biomass | N | Meter Stick |
| 7 | Dry Biomass | N | PlateMeter |
| 8 | Canopy Height | Y | 2 |
| 9 | Canopy Height | N | 2 |

To address competing indications of model performance, an Error, Consistency, and Mean Agreement (ECMA) score was calculated for ranking estimation effectiveness of each model. The score equally weighted the model error consistency (standard deviation of percent error), accuracy (mean of percent error), and the agreement of the mean of measured to estimated values ($R^2$ of estimate to measured, as well as difference in mean of estimate and measured) (Equation 2; Table 4). LSD mean estimate groupings were examined as a post hoc analysis of accuracy for biomass estimates as well as canopy height using validation samples only. This was done to illustrate the efficacy of using biomass or canopy height estimations calculated from sensor readings in place of destructive harvesting methods or physical height measurements for research trial evaluations. Biomass comparisons groups were delineated based on destructively measured biomass in 1000 kg ha$^{-1}$ increments from 0-6000 kg ha$^{-1}$ (Table 5). Canopy height comparisons were based on ten physically-measured canopy height classes at 10 cm increments (Table 6). These comparisons were performed using PROC MIXED [37] in combination with the PDMIX800 macro [43, 44].

TABLE 4

Sensor model ranking based on Error, Consistency, and Mean Agreement Score (ECMA).

| Forage Type | Measured/Model | Mean | Mean-Percent Error (MPE) | Standard Deviation MPE | $r^2$-Measured to Estimated | ECMA Score |
|---|---|---|---|---|---|---|
| DM (kg ha$^{-1}$) | | | | | | |
| ALL | Measured DM | 2032 | 0.19 | 0.36 | 0.87 | |
| ALL | 4 | 1955 | 0.37 | 0.43 | 0.69 | 0.057 |
| ALL | 1 | 1856 | 0.31 | 0.35 | 0.77 | 0.040 |
| ALL | 3 | 2281 | 0.43 | 0.58 | 0.78 | 0.013 |
| ALL | 2 | 2368 | 0.53 | 0.72 | 0.69 | 0.005 |
| ALL | 6 | 2571 | 0.67 | 0.75 | 0.68 | 0.003 |
| ALL | 5 | 2727 | 0.76 | 0.87 | 0.67 | 0.001 |
| ALL | 7 | 1575 | 0.49 | 0.60 | 0.17 | 0.001 |
| Alfalfa | Measured DM | 1893 | 0.19 | 0.36 | 0.87 | |
| Alfalfa | 1 | 1947 | 0.31 | 0.27 | 0.69 | 0.150 |
| Alfalfa | 5 | 1788 | 0.30 | 0.24 | 0.63 | 0.083 |
| Alfalfa | 3 | 2148 | 0.40 | 0.35 | 0.68 | 0.019 |
| Alfalfa | 7 | 1960 | 0.53 | 0.67 | 0.13 | 0.005 |
| Alfalfa | 4 | 2469 | 0.53 | 0.45 | 0.68 | 0.005 |
| Alfalfa | 6 | 2744 | 0.68 | 0.53 | 0.63 | 0.002 |
| Alfalfa | 2 | 2887 | 0.80 | 0.65 | 0.69 | 0.001 |
| Bermuda | Measured DM | 3029 | 0.19 | 0.36 | 0.87 | |
| Bermuda | 3 | 3095 | 0.32 | 0.57 | 0.85 | 0.069 |
| Bermuda | 1 | 3095 | 0.32 | 0.57 | 0.85 | 0.069 |
| Bermuda | 2 | 3139 | 0.36 | 0.60 | 0.81 | 0.033 |
| Bermuda | 4 | 2774 | 0.30 | 0.46 | 0.84 | 0.024 |
| Bermuda | 6 | 3217 | 0.36 | 0.55 | 0.82 | 0.022 |
| Bermuda | 5 | 3614 | 0.47 | 0.65 | 0.82 | 0.005 |
| Bermuda | 7 | 1729 | 0.63 | 0.69 | 0.25 | 0.000 |
| MIX | Measured DM | 1959 | 0.19 | 0.36 | 0.87 | |
| MIX | 4 | 1927 | 0.34 | 0.43 | 0.78 | 0.174 |
| MIX | 1 | 1663 | 0.30 | 0.26 | 0.79 | 0.035 |
| MIX | 3 | 2152 | 0.40 | 0.52 | 0.78 | 0.019 |
| MIX | 2 | 2309 | 0.50 | 0.71 | 0.79 | 0.006 |
| MIX | 6 | 2507 | 0.68 | 0.79 | 0.55 | 0.002 |
| MIX | 7 | 1508 | 0.48 | 0.58 | 0.17 | 0.001 |
| MIX | 5 | 2817 | 0.85 | 0.91 | 0.55 | 0.001 |
| Wheat | Measured DM | 2248 | 0.19 | 0.36 | 0.87 | |
| Wheat | 1 | 2491 | 0.41 | 0.65 | 0.81 | 0.013 |
| Wheat | 2 | 1985 | 0.49 | 0.79 | 0.76 | 0.007 |
| Wheat | 3 | 2886 | 0.63 | 0.94 | 0.80 | 0.002 |
| Wheat | 4 | 1376 | 0.42 | 0.33 | 0.82 | 0.007 |
| Canopy Height (cm) | | | | | | |
| ALL | Measured Height | 28.9 | | | | |
| ALL | 9 | 19.3 | 0.34 | 0.19 | 0.60 | 0.99 |
| ALL | 8 | 10.0 | 0.69 | 0.25 | 0.50 | 0.15 |
| Alfalfa | Measured Height | 30.8 | | | | |
| Alfalfa | 9 | 22.5 | 0.30 | 0.18 | 0.61 | 0.04 |
| Alfalfa | 8 | 21.0 | 0.33 | 0.18 | 0.59 | 0.03 |
| Bermuda | Measured Height | 36.1 | | | | |
| Bermuda | 8 | 29.0 | 0.21 | 0.13 | 0.79 | 4.05 |
| Bermuda | 9 | 26.0 | 0.28 | 0.13 | 0.84 | 2.29 |
| MIX | Measured Height | 28.2 | | | | |
| MIX | 9 | 18.5 | 0.35 | 0.19 | 0.57 | 0.88 |
| MIX | 8 | 7.2 | 0.77 | 0.17 | 0.59 | 0.21 |

TABLE 5

Mean estimates for destructively measured DM and sensor estimates.

| | | | Sensor DM Models | | | |
|---|---|---|---|---|---|---|
| Forage Class | DM Class | Measured DM | 1 | 2 | 3 | 4 |
| Alfalfa | 1 | 780E | 1170D | 1996E | 1368D | 1572D |
| Alfalfa | 2 | 1500D | 1689C | 2575D | 1898C | 2183C |
| Alfalfa | 3 | 2474C | 2420B | 3384C | 2628B | 3020B |
| Alfalfa | 4 | 3266B | 2964A | 4078B | 3136A | 3604A |
| Alfalfa | 5 | 4432A | 3460A | 4780A | 3641A | 4185A |
| LSD | | 202 | 401 | 470 | 405 | 466 |
| Bermuda | 1 | 612F | 1321E | 1436D | 1321E | 1168E |

TABLE 5-continued

Mean estimates for destructively measured DM and sensor estimates.

| | | | | | | |
|---|---|---|---|---|---|---|
| Bermuda | 2 | 1545E | 1795E | 1892D | 1795E | 1585E |
| Bermuda | 3 | 2692D | 2624D | 2664C | 2624D | 2351D |
| Bermuda | 4 | 3425C | 3448C | 3336C | 3448C | 3092C |
| Bermuda | 5 | 4529B | 4720B | 4560B | 4720B | 4227B |
| Bermuda | 6 | 6332A | 5617A | 5925A | 5617A | 5093A |
| LSD | | 489 | 686 | 770 | 686 | 624 |
| MIX | 1 | 759G | 891F | 1651F | 1393F | 1244F |
| MIX | 2 | 1468F | 1150E | 1857E | 1656E | 1480E |
| MIX | 3 | 2430E | 2110D | 2644D | 2585D | 2319D |
| MIX | 4 | 3446D | 2744C | 3178C | 3136C | 2816C |
| MIX | 5 | 4466C | 4040B | 4511B | 4569B | 4102B |
| MIX | 6 | 5583B | 4596A | 5114A | 5045A | 4527A |
| MIX | 7 | 6410A | 4143B | 4563B | 4490B | 4031B |
| LSD | | 145 | 256 | 227 | 253 | 227 |
| Wheat | 1 | 709F | 1376D | 1469E | 1757D | 823D |
| Wheat | 2 | 1425E | 1631D | 1645D | 2062D | 927D |
| Wheat | 3 | 2505D | 2553C | 2049C | 2962C | 1405C |
| Wheat | 4 | 3494C | 3934B | 2602B | 4315B | 2076B |
| Wheat | 5 | 4441B | 4520A | 2793AB | 4799AB | 2442A |
| Wheat | 6 | 5676A | 4977A | 2957A | 5311A | 2737A |
| LSD | | 248 | 486 | 246 | 496 | 252 |
| All | 1 | 753G | | 1670F | | 1241E |
| All | 2 | 1468F | | 1913E | | 1495D |
| All | 3 | 2460E | | 2674D | | 2316C |
| All | 4 | 3442D | | 3124C | | 2719B |
| All | 5 | 4465C | | 4354B | | 3931A |
| All | 6 | 5725B | | 4726A | | 4188A |
| All | 7 | 6410A | | 4563AB | | 4031A |
| LSD | | 130 | | 253 | | 256 |

| | | | Measured Height DM Models | | |
|---|---|---|---|---|---|
| | | | 5 | 6 | 7 |
| Alfalfa | 1 | 780E | 1074D | 1649D | 1545D |
| Alfalfa | 2 | 1500D | 1567C | 2405C | 1887C |
| Alfalfa | 3 | 2474C | 2170B | 3331B | 2097BC |
| Alfalfa | 4 | 3266B | 2767A | 4246A | 2389AB |
| Alfalfa | 5 | 4432A | 3185A | 4887A | 2790A |
| LSD | | 202 | 425 | 653 | 426 |
| Bermuda | 1 | 612F | 1470E | 1308E | 1459B |
| Bermuda | 2 | 1545E | 2522D | 2245D | 1513B |
| Bermuda | 3 | 2692D | 3208C | 2855C | 1574B |
| Bermuda | 4 | 3425C | 4400B | 3916B | 1863AB |
| Bermuda | 5 | 4529B | 5110AB | 4547AB | 2129A |
| Bermuda | 6 | 6332A | 5850A | 5206A | 2060AB |
| LSD | | 489 | 881 | 784 | 570 |
| MIX | 1 | 759G | 2024F | 1802F | 1355C |
| MIX | 2 | 1468F | 2616E | 2328E | 1360C |
| MIX | 3 | 2430E | 2966D | 2640D | 1729B |
| MIX | 4 | 3446D | 3238C | 2882C | 1716B |
| MIX | 5 | 4466C | 4961B | 4415B | 2023A |
| MIX | 6 | 5583B | 5406A | 4811A | 1906AB |
| MIX | 7 | 6410A | 4885AB | 4348AB | 1930AB |
| LSD | | 145 | 328 | 292 | 229 |
| All | 1 | 753G | | 1768F | 1383C |
| All | 2 | 1468F | | 2336E | 1429C |
| All | 3 | 2460E | | 2742D | 1762B |
| All | 4 | 3442D | | 3087C | 1797B |
| All | 5 | 4465C | | 4519B | 2177A |
| All | 6 | 5725B | | 4895A | 1938AB |
| All | 7 | 6410A | | 4348B | 1930AB |
| LSD | | 130 | | 299 | 232 |

TABLE 6

Canopy height comparisons based on ten physically-measured canopy height classes at 10 cm increments.

| Forage Class | Height Class | Measured Canopy Height | Model 8 | Model 9 |
|---|---|---|---|---|
| Alfalfa | 1 | 12J | 16CD | 16DE |
| Alfalfa | 2 | 17I | 14D | 15E |
| Alfalfa | 3 | 21H | 16D | 18DE |
| Alfalfa | 4 | 27G | 16CD | 18DE |
| Alfalfa | 5 | 33F | 22BC | 22CD |
| Alfalfa | 6 | 37E | 20BCD | 23CD |

TABLE 6-continued

Canopy height comparisons based on ten physically-measured canopy height classes at 10 cm increments.

| Forage Class | Height Class | Measured Canopy Height | Model 8 | Model 9 |
|---|---|---|---|---|
| Alfalfa | 7 | 43D | 27B | 28C |
| Alfalfa | 8 | 47C | 26B | 29BC |
| Alfalfa | 9 | 53B | 32A | 35AB |
| Alfalfa | 10 | 57A | 35A | 38A |
| LSD | | 2 | 6 | 6 |
| Bermuda | 1 | 14I | 13D | 11D |
| Bermuda | 2 | 16I | 13D | 11D |
| Bermuda | 3 | 21H | 17CD | 15CD |
| Bermuda | 4 | 29G | 24BCD | 20BCD |
| Bermuda | 5 | 31F | 25BC | 22BC |
| Bermuda | 6 | 36E | 28B | 25B |
| Bermuda | 7 | 42D | 30B | 27B |
| Bermuda | 8 | 54C | 43A | 39A |
| Bermuda | 9 | 57B | 47A | 43A |
| Bermuda | 10 | 66A | 51A | 48A |
| LSD | | 3 | 12 | 10 |
| MIX | 1 | 12J | 2F | 13E |
| MIX | 2 | 17I | 3F | 14E |
| MIX | 3 | 22H | 3F | 14E |
| MIX | 4 | 27G | 5E | 16D |
| MIX | 5 | 32F | 7D | 19C |
| MIX | 6 | 36E | 6DE | 19C |
| MIX | 7 | 42D | 7DE | 21C |
| MIX | 8 | 48C | 22C | 34B |
| MIX | 9 | 52B | 27B | 38A |
| MIX | 10 | 57A | 31A | 40A |
| LSD | | 1 | 2 | 3 |
| ALL | 1 | 12J | | 13F |
| ALL | 2 | 17I | | 14F |
| ALL | 3 | 22H | | 14F |
| ALL | 4 | 27G | | 16E |
| ALL | 5 | 32F | | 20D |
| ALL | 6 | 36E | | 20D |
| ALL | 7 | 42D | | 24C |
| ALL | 8 | 48C | | 33B |
| ALL | 9 | 53B | | 38A |
| ALL | 10 | 57A | | 40A |
| LSD | | 1 | | 2 |

3. Results and Discussion

3.1. Correlation

Laser estimated height measurements were the most correlated to physically measured canopy height in all cases (R=0.88-0.78) (Table 1). When species differentiation was considered, laser measurements were the most correlated to destructively sampled biomass (R=0.88-0.80). Among sensor measurements, the 120 MHz ultrasonic was the most correlated to biomass measured on a destructively sampled basis when no species differentiation was taken into account (R=0.78-0.74). Additionally, NDVI measured using the active sensor was most correlated to biomass (R=0.75-0.62) for all spectral data examined with and without species consideration.

3.2. Modeling

3.2.1. Variable Inclusion

All height sensor parameters were associated with VIP values greater than the exclusionary threshold of 0.8 for both biomass and canopy height (Table 2; FIG. 1). VIP values were greater and CPSE values further from zero for the 120 MHz ultrasonic sensor than for the 240 MHz ultrasonic sensor. The 120 MHz ultrasonic sensor was subsequently selected for inclusion in biomass and canopy height model construction. Normalized Difference Vegetation Index was selected as the spectral component for inclusion in biomass model construction based on greater Pearson coefficients and VIP values as compared to other spectral data. It must also be noted the CPSE associated with NDVI was not furthest from zero for all spectral data examined (Table 2).

3.2.2. Model Performance

Four sensor models, two physically-measured height models, and one plate meter model for biomass estimation as well as two models for canopy height estimation were generated for estimation performance evaluation (Table 3). Except for cases of no species consideration, laser only models explained more variation (78%) in dependent variables than did ultrasonic only models (75%) for both biomass and canopy height. Combination models which included laser and ultrasonic improved dependent variable variation explanation in all cases except for wheat biomass (75%) and bermudagrass canopy height (77%). Inclusion of NDVI for biomass modeling improved dependent variable variation explanation by an additional 1%. Biomass models based on physically-measured canopy height were more effective than others in explanation of dependent variable variation for alfalfa (68.5%). Plate meter-based models were less effective than others for both canopy height and biomass estimation (0-23%)(Table 7).

TABLE 7

Dependent variables explanation for dry biomass and canopy height by sensor estimation models.

| DM | Canopy Height | Plate Meter | 120 Mhz Ultrasonic | Laser |
|---|---|---|---|---|
| Alfalfa | 68.5% | 18% | 55% | 64% |
| Bermuda | 69% | 23% | 75% | 78% |
| Wheat | | | 72% | 74% |
| MIX | 67.8% | 19% | 73% | 73% |
| ALL | 64.4% | 17% | 62% | 58% |

| | 3 Sensor Model | 3 Sensor Equation | 2 Sensor Model | 2 Sensor Equation |
|---|---|---|---|---|
| Alfalfa (%) | 65.7% | (46.22*Las + 47.83(Son*NDVI) | 65.5% | (46.9*Las) + (43.13*Son) |
| Bermuda | 80.5% | (65.3*Las) + 58.3(Son*NDVI) | 81% | (65.7*Las) + (49*Son) |
| Wheat | 75% | (118*Las) + 108(Son*NDVI) | 74% | 231*Las |
| MIX | 78.9% | 70.5(Las*NDVI) + 63.7(Son*NDVI) | 78.5% | (61.3*Las) + (53.9*Son) |
| ALL | 65.8% | 1.6(Las*Son) + (2624*NDVI) | 64.5% | (53.5*Las) + (50*Son) |

| Canopy Height | | Plate Meter | 120 Mhz Ultrasonic | Laser |
|---|---|---|---|---|
| Alfalfa | | <0% | 57% | 69% |
| Bermuda | | <0% | 67% | 77% |

TABLE 7-continued

Dependent variables explanation for dry biomass and canopy height by sensor estimation models.

| | | | |
|---|---|---|---|
| MIX | <0% | 54% | 61% |
| ALL | 6.1% | 55% | 64% |

| | 2 Sensor Model | 2 Sensor Equation |
|---|---|---|
| Alfalfa | 70% | (0.46*Las) + (0.42*Son) |
| Bermuda | 77% | 1.02*Las |
| MIX | 64% | 0.017(Las*Son) |
| ALL | 65% | (0.74*Las) + (0.2*Son) |

Regression relationships for estimates regressed with measured values were compared to the regression of paired bermudagrass plots ($R^2=0.87$). The greatest $R^2$ observed for any estimated to measured biomass relationship was the species-specific dual height sensor combination in bermudagrass ($R^2=0.85$). The lowest $R^2$ observed in all cases was for plate meter models (0.13-0.25). Comparison of biomass model estimation based on ECMA scores showed that the species-specific models which included both height sensors as well as NDVI were more accurate in all cases except for the legume-grass mixture (Table 4). The non-species-specific dual height sensor model achieved the greatest score in the case of the legume-grass mixture for biomass estimation. The species-specific measured height model was ranked second for alfalfa biomass estimation and was the only instance of a physical measurement model being ranked in the top two for biomass estimation. Regression of estimated canopy height to measured canopy height using the non-species-specific model in bermudagrass produced the greatest $R^2$ for all cases ($R^2=0.84$). $R^2$ values for canopy height estimates in alfalfa, legume-grass mixture, and the non-species-specific models were less than 0.61. Based on ECMA scores, the non-species-specific canopy height estimation models produced more accurate estimates than species-specific models for the legume-grass mixture, alfalfa, and non-species-specific groups (Table 4).

3.3. Post Hoc Comparisons 3.3.1. Limits of Agreement Analyses

Limits of agreement analyses (Table 8) illustrated the variation in the standard method of destructively sampled measurement to be −1517 to 1517 kg ha$^{-1}$. The variation of the two sensor model estimation was −1558 to 1582 kg ha$^{-1}$. Sonic alone as an estimator exhibited a variance component of −2423 to 1583 kg ha$^{-1}$, while laser alone was −1600 to 1633 kg ha$^{-1}$. The combination laser-sonic model produced the most repeatable results with a variation residual of 106 and was effective in illustrating repeatability in measurement. Subsequently, estimation models implemented for biomass based on destructively harvested values would likely not produce estimates with greater precision than that of the destructively harvested measures. LSD Mean Estimates (Tables 5 and 6)

TABLE 8

Limits of Agreement (LOA) variance components for sensor estimates and destructively measured dry biomass in bermudagrass.

| Model/Measure | Lower Limit | Upper Limit | Variance Residual |
|---|---|---|---|
| Laser | −1600 | 1633 | 171 |
| 120 Mhz Sonic | −2423 | 1583 | 462 |
| Laser + Sonic | −1558 | 1582 | 106 |
| Harvester | −1517 | 1517 | 536 |

3.3.2. Sensor Models

Sensor models consistently overestimated low biomass values and underestimated high values. Although overestimation of low biomass occurred, species-specific models most closely approximated the lowest measured values while generalized models most closely approximated high measured values. Sensor models consistently underestimated canopy height for taller measured values but produced estimates within 4 cm of the lowest measured height. The only exception in minimum canopy height estimation occurred in MIX-specific model estimates for the (mean estimate percent error −73%). The LSD values for all estimation models were greater than those for the measured values. This indicated more variation within estimated data for both canopy height and biomass. Subsequently, overlapping of mean estimate groups occurred due to greater LSD values for the estimated biomass and canopy height as compared to measured. Order of mean estimates for measured biomass and sensor estimated biomass agreed except in the grass-legume mixture and the general three sensor model when applied to ALL. In these cases of order inconsistency, only the highest categories were inconsistent with measured values (In excess of 6000 kg ha$^{-1}$). The species-specific three sensor model consistently produced lower biomass estimates than did the species-specific dual sensor model. The opposite was the case for the generalized models in that delineation of estimates by species produced greater mean estimates for the three sensor system than the dual sensor system (Table 5).

3.3.3. Measured Canopy Height Models

Physically-measured canopy height models varied by model and species in overestimation versus underestimation of biomass, although all models overestimated the lowest measured values. The general model overestimated whereas the species-specific underestimated alfalfa biomass. The species-specific and general models overestimated bermudagrass biomass except for the greatest measured biomass. Biomass estimates for the mixture using both the species-specific and general models overestimated at lesser values and underestimated at greater measured values. The plate meter biomass estimation model ordered mean estimates the same as measured for only the alfalfa data and consistently overestimated low and underestimated high measured values.

3.3.4 Measurement and Estimate Variability

Due to the variation associated with destructively-measured biomass, it is unlikely that an estimation strategy based on this method of measure could achieve accuracy or precision in excess of the method upon which it is based. This destructively measured variability illustrated in the LOA analysis suggests optimal estimation models would likely not achieve precision greater than approximately 1500 kg ha$^{-1}$ (Table 8). Subsequently, it is likely variability in estimation of biomass will be of the same magnitude or greater than that of the destructively-sampled method which is illustrated where LSD values are lowest for measured biomass (Table 4). Additionally, sensor estimations provide equivalent and/or superior estimates when compared to physical canopy height measurement and plate meter biomass estimation methods (Table 7, Table 5). It is arguable that the same is the case for collection of sensor-based canopy height data though a maximum height threshold of accuracy is likely. Due to the commonly accepted nature of physical measure biomass estimates for research applications, sensor based estimation strategies which utilize species differentiation in appropriate cases, and ultrasonic/laser proximal sensor combinations have in this research been illustrated to produce comparable and/or more accurate results (Table 5).

3.3.5. Software and Data Acquisition Logistics

Initially, WinWedge Pro was implemented as the software package for data acquisition. It was quickly recognized that for the most efficient system performance additional user utilities were necessary. Three aspects which were initially identified as necessary for such a system to function properly were: 1. Unique configurations for each piece of hardware acquiring and transmitting data. 2. Real-time AOI data identification capabilities. 3. Single output file containing all parameters at a standard rate of acquisition.

The ability of the user to define unique configurations for each piece of data transmitting hardware was necessary due to the fact that interfacing protocols for various hardware are typically different and may need to be adjusted due to the nature of transmitted data. Additionally, the assimilation of new hardware into the system for additional parameter measurement would likely occur and require a software application with configuration dynamics to allow this. It was also observed that many devices will transmit undesired data fields with each record such as serial numbers or line end characters. Unique configurations to minimize and/or eliminate the insertion of these data fields were also necessary in order to reduce recording of unwanted data. Conversely, insertion of a time/date stamp data field for each record was desired in order to enable quality control measures and in some cases merging or parsing data. Again this required further configuration capabilities but was ultimately included as a default output field in SDlogger.

Identification of AOI data on-the-go was examined as GPS delineation and power cycling provided parsing utility which required extensive manual post processing and the use of additional software. Inserting incremental plot identifiers satisfied the need for a more efficient mechanism to sort output files and eliminate undesired data in much more time effective manner. Acceptable functionality of this feature was observed when applied as a whole plot averaging strategy. This "marking" mechanism was largely designed for application in a touch screen environment and installed as a screen display button. Due to this design strategy, laptop utilization of the application still required a mouse click which could at some times be cumbersome while collecting on-the-go data. This utility was not available through the use of WinWedge Pro which diminished the prospects for continued use of this commercially available hyperterminal software for some such high through-put systems.

Initially, when using Winwedge Pro a single file would be created for each stream of incoming data. All data transmitted by a piece of hardware would be written a log file at the device specific rate of transmission. Therefore post processing of the data was necessary to combine files and eliminate undesired data. This prompted the examination of an accommodation in the development of SDlogger for writing all data acquired to a single output file. In order for this to be possible a sampling strategy was adopted as opposed to the capture of all incoming data with WinWedge Pro. This sampling strategy allowed the user to define the rate of data acquisition such that all data transmitting hardware could function at unique transmission rates but data would be captured by acquiring data at the application level only at the specified rate (i.e., 10 Hz, 20 Hz, etc.). The result of this utility produced a single output file which included one value for each data parameter in the user defined order and was preceded by a time/date stamp for each record as one row of data (i.e. Row1. T/D Stamp, height, NDVI, GPS, etc.).

Possible hardware platforms were also a point of examination as the desired end software product would be required to operate on touch screen devices as well as laptop computers. Later into software development it also became necessary to examine hardware platform performance capabilities as a page fault rate spike was initiated due to the magnitude of incoming data. This presented as a substantial hindrance in acquiring data at rates in excess of 20 Hz for those devices which transmitted data strings that contained more than 5 data fields when using WinWedge Pro (i.e. Active Spectrometer, GPS). Some alleviation of this was achieved at the application level by eliminating the display of the actual incoming data and replacing it with a counter such that an indication of incoming data could still be visually evaluated. It must be noted that even with the inclusion of this "fix" some hardware platforms may not have the processing capabilities to effectively acquire high rates of complex data.

CONCLUSION

Using mobile sensor systems for biomass estimation can enable a greater rate of data acquisition providing an appropriate software option for acquisition is employed. Results from this study illustrate quantification of only the canopy height can provide for biomass estimation models equivalent to and/or more effective than those which include spectral components. This is an important distinction as the cost associated with assimilation of an active spectral radiometer into such a system can greatly increase costs. An increase of approximately 1% in dependent variable variation explanation was contributed to the system at a cost in excess of US$4000. In contrast, height sensors and a DAQ would only incur a total cost of approximately US$1500. Consideration should also be given to the time savings associated with using a mobile sensor system. During the course of these studies it was noted man hours needed for physical collection of these data were greater by a factor of 60 that the time needed to collect data with the sensor system. Furthermore, processing of data acquired using SDlogger reduced man hour requirements by a factor of 10.

In order for the greatest level of precision to be obtained, it is likely necessary to implement specific models for predominant or monoculture species though a general estimation model can produce acceptable estimates. It may also be possible to stratify implementation of models based on height measurement. This would allow adjustment of coefficients to accommodate minimum and maximum values which can be estimated imprecisely if only one model is applied to the entire range of canopy heights encountered. Qualification of relative vegetative performance based on canopy height and/or biomass would also be possible and could contribute to variety selection for plant breeding. In a qualitative system, some difficulties that may be encountered in system calibration and sensor data conversion to absolute measures could be avoided. It can also be ascertained that results reported for research could be based on sensor-estimated biomass without the expectation of appreciable differences than would be reported from destructively sampled methods. Enabling evaluation of biomass production without exerting influence on the system by vegetation removal would be useful in research scenarios where removal could negatively impact the longevity and homogeneity of trials. Ultimately real-world production management decisions could be made in a much more rapid manner such as stocking rate adjustments or forage harvesting intervals. Further examination of spectral data as model components will also be necessary as there will likely be scenarios where these data will be more contributive than the observations made during this study. Future examination of additional species is necessary to develop an optimally robust collection of models for estimating DM across different environments and for a variety of research and production systems.

Calculation of Mean Percent Error $$\text{Mean Percent Error} = \text{Mean} \sum_n \frac{1}{n} \frac{|\text{Estimate} - \text{Measured}|}{\text{Measured Dry Mass}} \quad \text{Equation 1}$$

Calculation of Error, Consistency, and Mean Agreement (ECMA) Score $$ECMA = \frac{\left( \begin{array}{c} \text{Coefficient of determination} \\ \text{for estimate by measured} \\ \hline |\text{estimate mean} - \text{measured mean}| \end{array} \right)}{\text{mean percent error} *\text{standard deviation of percent error}} \quad \text{Equation 2}$$

What is claimed is:

1. A system for estimating forage growth at an area of interest, comprising:
    a mobile support;
    a laser sensor supported by the mobile support and configured to sense a first time-of-flight corresponding to the forage growth at the area of interest to generate laser forage data corresponding to the forage growth, the laser sensor disposed in a first plane;
    an ultrasonic sensor supported by the mobile support and positionally associated with the laser sensor, the ultrasonic sensor being configured to sense a second time-of-flight corresponding to the forage growth at the area of interest to generate ultrasonic forage data corresponding to the forage growth, the ultrasonic sensor disposed in a second plane, the second plane configured to be positioned independent of the first plane; and
    a processing unit configured to:
        receive the laser forage data from the laser sensor and the ultrasonic forage data from the ultrasonic sensor; and
        determine a measured forage growth value as a growth function of the laser forage data and the ultrasonic forage data.

2. The system of claim 1, wherein the forage growth corresponds to a forage height.

3. The system of claim 1, wherein the mobile support is configured to move relative to the area of interest.

4. The system of claim 1, wherein the ultrasonic sensor has a signal frequency of 120 Mhz.

5. The system of claim 1, wherein the ultrasonic sensor and the laser sensor are each configured to sense the forage growth at a sampling rate up to 20 Hz.

6. The system of claim 1, wherein the laser sensor is configured to operate at a single wavelength of about 660 nm.

7. The system of claim 1, wherein the laser sensor is positioned in a first plane and the ultrasonic sensor is positioned in a second plane, the laser sensor configured to sense the forage growth substantially perpendicular to the first plane and the ultrasonic sensor configured to sense the forage growth substantially perpendicular to the second plane.

8. The system of claim 1, wherein the laser sensor is positioned between about 2 inches to about 14 inches from the ultrasonic sensor.

9. The system of claim 1, wherein the laser sensor is calibrated to have a minimum value at a surface of the area of interest and a maximum value at a supported height above the area of interest, and wherein the laser forage data is inversely proportional to the forage growth.

10. The system of claim 1, wherein the ultrasonic sensor is calibrated to have a maximum value at a surface of the area of interest and a minimum value at a supported height above the area of interest, and wherein the ultrasonic forage data is directly proportional to the forage growth.

11. The system of claim 1, wherein the laser sensor is configured to sense multiple laser forage data points corresponding to the forage growth, and the ultrasonic sensor is configured to sense multiple ultrasonic forage data points corresponding to the forage growth.

12. The system of claim 11, wherein the processing unit is further configured to associate a laser sensed time with each of the laser forage data points and an ultrasonic sensed time with each of the ultrasonic forage data points.

13. The system of claim 12, wherein the processing unit is further configured to synchronize the laser forage data points at the laser sensed time with the ultrasonic forage data points at the ultrasonic sensed time.

14. The system of claim 1, wherein the laser sensor and the ultrasonic sensor are moveable relative to the area of interest, the laser sensor configured to sense between about 4 to about 5 laser forage data points per meter of movement relative to the area of interest and the ultrasonic sensor configured to sense between about 4 to about 5 ultrasonic forage data points per meter of movement relative to the area of interest.

15. The system of claim 1, wherein the laser sensor is configured to have a laser sensing footprint and the ultrasonic sensor is configured to have an ultrasonic sensing footprint, the laser footprint being smaller than the ultrasonic footprint.

16. A method of computing forage growth at an area of interest, comprising:
    moving a laser sensor on a first plane and an ultrasonic sensor on a second plane relative to the area of interest, the moving of the first plane independent of the moving of the second plane;
    obtaining a first time-of-flight corresponding to laser forage data from the laser sensor at a processing unit, the laser forage data corresponding to the forage growth at the area of interest;
    obtaining a second time-of-flight corresponding to ultrasonic forage data from the ultrasonic sensor at the processing unit, the ultrasonic forage data corresponding to the forage growth at the area of interest; and determining a measured forage growth value as a function of contributions from the laser forage data and the ultrasonic forage data with the processing unit.

17. The method of claim 16, wherein the ultrasonic sensor has a signal frequency of 120 Mhz.

18. The method of claim 16, wherein obtaining the laser forage data and obtaining the ultrasonic forage data each comprise sensing the forage growth at a sampling rate up to 20 Hz.

19. The method of claim 16, wherein the laser sensor comprises a single laser beam having a single wavelength.

20. The method of claim 16, further comprising positioning the laser sensor in a first plane and positioning the ultrasonic sensor in a second plane, the laser sensor being configured to sense the forage growth substantially perpendicular to the first plane and the ultrasonic sensor being configured to sense the forage growth substantially perpendicular to the second plane.

21. The method of claim 16, further comprising calibrating the laser sensor to have a minimum value at a surface of the area of interest and a maximum value at a supported height above the area of interest, wherein the laser forage data is inversely proportional to the forage growth.

22. The method of claim 16, further comprising calibrating the ultrasonic sensor to have a maximum value at a surface of the area of interest and a minimum value at a supported height above the area of interest, wherein the ultrasonic forage data is directly proportional to the forage growth.

23. The method of claim 16, wherein the laser sensor is configured to sense multiple laser forage data points corresponding to the forage growth and the ultrasonic sensor is configured to sense multiple ultrasonic forage data points corresponding to the forage growth.

24. The method of claim 23, further comprising associating a laser sensed time with each of the laser forage data points and an ultrasonic sensed time with each of the ultrasonic forage data points.

25. The method of claim 24, further comprising synchronizing the laser forage data points at the laser sensed time with the ultrasonic forage data points at the ultrasonic sensed time.

26. The method of claim 16, wherein the laser sensor is configured to have a laser sensing footprint and the ultrasonic sensor is configured to have an ultrasonic sensing footprint, the laser footprint being smaller than the ultrasonic footprint.

27. The method of claim 16, wherein the step of determining the measured forage growth value weights the laser forage data greater than the ultrasonic forage data.

28. The method of claim 16, wherein determining the measured forage growth value comprises:
    averaging the laser forage data to provide an average laser datum;
    averaging the ultrasonic forage data to provide an average ultrasonic datum;
    multiplying the average laser datum by a laser coefficient to generate an adjusted laser datum;
    multiplying the average ultrasonic datum by an ultrasonic coefficient to generate an adjusted ultrasonic datum; and
    calculating a sum of the adjusted laser datum and the adjusted ultrasonic datum.

29. The method of claim 28, wherein the laser coefficient is greater than the ultrasonic coefficient, whereby the laser forage data is weighted more than the ultrasonic forage data in the growth function.

30. A method of computing forage growth at an area of interest, comprising:
    calibrating a laser sensor on a first plane and an ultrasonic sensor on a second plane to account for positional differences in the first plane and second plane;
    obtaining a first time-of-flight corresponding to laser forage data from the laser sensor corresponding to the forage growth at the area of interest;
    obtaining a second time-of-flight corresponding to ultrasonic forage data from the ultrasonic sensor corresponding to the forage growth at the area of interest;
    receiving the laser forage data and the ultrasonic forage data at a processing unit; and
    determining a measured forage growth value as a function of the laser forage data and the ultrasonic forage data with the processing unit.

* * * * *